US012802544B2

(12) United States Patent
Xu et al.

(10) Patent No.: US 12,802,544 B2
(45) Date of Patent: Nov. 17, 2026

(54) CUSTOMIZABLE ENVIRONMENTAL INTERACTION AND RESPONSE SYSTEM FOR IMMERSIVE DEVICE USERS

(71) Applicant: Adeia Guides Inc., San Jose, CA (US)

(72) Inventors: Ning Xu, Irvine, CA (US); Reda Harb, Tampa, FL (US); Tao Chen, Palo Alto, CA (US); Aldis Sipolins, Somerville, MA (US)

(73) Assignee: Adeia Guides Inc., San Jose, CA (US)

( * ) Notice: Subject to any disclaimer, the term of this patent is extended or adjusted under 35 U.S.C. 154(b) by 179 days.

(21) Appl. No.: 18/660,691

(22) Filed: May 10, 2024

(65) Prior Publication Data

US 2025/0349195 A1 Nov. 13, 2025

(51) Int. Cl.
*G08B 21/00* (2006.01)
*G06F 40/30* (2020.01)
*G08B 3/10* (2006.01)
*G08B 5/22* (2006.01)

(52) U.S. Cl.
CPC ............. *G08B 21/00* (2013.01); *G06F 40/30* (2020.01); *G08B 3/10* (2013.01); *G08B 5/22* (2013.01)

(58) Field of Classification Search
CPC .................................... G08B 3/10; G08B 5/22
USPC .......................................................... 340/540
See application file for complete search history.

(56) References Cited

U.S. PATENT DOCUMENTS 10,380,875 B1 * 8/2019 Roberts .................... G08B 7/06
11,599,890 B1 * 3/2023 Kalaboukis ........ G06Q 30/0185
2016/0381450 A1 * 12/2016 Taite .................... H04R 1/1041 381/74
2023/0094511 A1 * 3/2023 Guha ...................... G10L 15/01 704/231
2023/0316006 A1 * 10/2023 Tunstall-Pedoe ....... G06F 40/30 704/9
2023/0394855 A1 * 12/2023 Xie ........................ G06V 20/70
2024/0202986 A1 6/2024 Singh
2024/0394561 A1 * 11/2024 Veselin ............... G06F 16/3329

OTHER PUBLICATIONS

Charles Dasher, et al., "Systems and Methods for Providing Parental Controls for HMD Content", (U.S. Appl. No. 18/636,477, filed Apr. 16, 2024).

(Continued)

*Primary Examiner* — Jack K Wang
(74) *Attorney, Agent, or Firm* — HG Law LLP

(57) ABSTRACT

Systems and methods for providing real-world awareness surrounding an XR device and executing a response upon occurrence of a real-world event are disclosed. Input data that describes an event trigger and a response to the event trigger is received and transcribed to text. Sensors are used to monitor the real world surrounding the XR device. Data from the sensors is inputted into a model, such as a large language model (LLM), to obtain a textual description, and then used to detect the occurrence of the event trigger. Semantic matching of the textual description and the received event trigger is performed. A confidence level of the match is determined. Based on the occurrence of the trigger and the level of confidence that it occurred, a predetermined response is executed. The response may allow the user to enjoy the immersive environment of the XR device while addressing real-world events.

23 Claims, 10 Drawing Sheets

(56) References Cited

OTHER PUBLICATIONS

Chen, Guo, et al. "VideoLLM: Modeling Video Sequence with Large Language Models." arXiv preprint arXiv:2305.13292 (2023).
Christopher Phillips et al., "VR Geofencing for Play Space and VR Application Enablement and Disablement", (U.S. Appl. No. 18/592,303, filed Feb. 29, 2024).
Zhiyun Li, et al., "Systems and Methods for Capturing an Image of a Desired Moment", (U.S. Appl. No. 18/101,251, filed Jan. 25, 2023).

* cited by examiner

| | | | |
|---|---|---|---|
| XR device | Smartwatch | Smart earbuds | Smart headphone |
| Smartphone | Laptop | Tablet | Smart glasses |
| Any display or hearing device that provides Wi-Fi/internet connection | | | |

CUSTOMIZABLE ENVIRONMENTAL INTERACTION AND RESPONSE SYSTEM FOR IMMERSIVE DEVICE USERS

FIELD OF DISCLOSURE

The present disclosure relates to obtaining sensor data of an environment outside an immersive user device and performing semantic matching of the data with event triggers to activate a response. The present disclosure also relates to virtual/augmented reality experiences for allowing interaction with the environment outside the virtual environment based on sensor data received by monitoring the environment outside the virtual environment.

BACKGROUND

People are often immersed in their devices and the content presented on the devices. Whether they are sitting in a coffee shop, walking, jogging, on a train, on a plane, or just waiting anywhere, they are more often than not on their devices. The immersive nature of the devices and the content presented on the devices often prevent the user from being fully aware of their surroundings. There are many stories about how people have run into others while walking since they are immersed in their devices and not paying attention to foot traffic, or people not responding to their name when called since their focus is on playing a game on their mobile device. As such, the issue of maintaining environmental awareness while using immersive technologies has been known for some time, particularly as virtual reality applications have become more prevalent in various sectors, including entertainment, education, and professional settings.

Prior solutions have attempted to address components of this environmental awareness problem. For example, some virtual reality/augmented reality (VR/AR) systems integrate external cameras to overlay real-world images onto the virtual environment, providing a limited form of environmental awareness. Noise-canceling headphones have also introduced transparency modes or ambient sound features that allow external sounds to be heard, albeit in a controlled manner.

However, these prior solutions have several limitations. The integration of real-world images in VR/AR often disrupts the immersive experience or provides an inadequate representation of the environment. Similarly, the ambient sound features in noise-canceling headphones can't distinguish between important sounds (like an announcement) and background noise, often leading to a compromised or less effective noise-cancelation experience.

When devices such as phones, smartwatches, and tablets are used by people to play games, work, or consume content, they also create an immersive environment thereby taking the user's attention and focus away from their surroundings. Very few, if any, solutions have been made available for devices such as phones, smartwatches, and tablets that would allow the user to continue being immersed and at the same time aware of their environment.

As such, there is a need for better systems and methods for providing environmental awareness to users who are immersed in immersive experiences that includes the user enjoying their immersive experience and at the same time interacting with events outside the immersive environment when needed.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale. Various objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
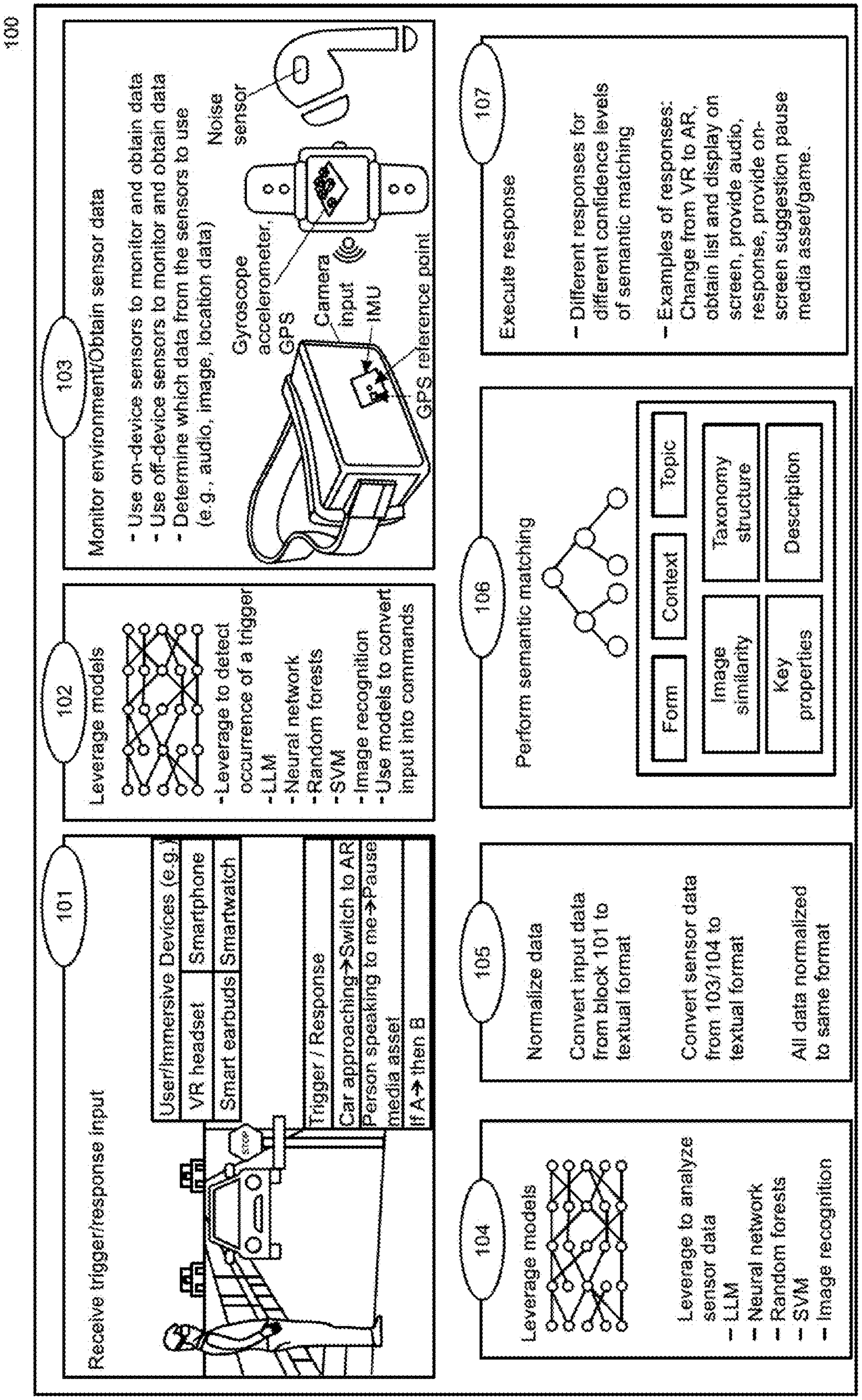
FIG. 1 is a block diagram of a process for providing awareness outside an immersive environment and executing responses to environmental triggers based on obtained sensor data, in accordance with some embodiments of the disclosure.

In accordance with some embodiments disclosed herein, some of the above-mentioned limitations are overcome by providing awareness outside an immersive environment, for a user who is immersed in the immersive environment, by monitoring the environment outside the immersive environment, obtaining sensor data from the monitoring, leveraging a large language model (LLM) to generate a textual output for the obtained sensor data, and executing an action if an event occurring outside the immersive environment relates to an event trigger. The execution of the action makes the user aware of the environmental event and able to respond to the event as they desire.

The process of providing such awareness of the environment outside an immersive environment and executing a response or action includes receiving an input from a user device. The user device may be an immersive device or a device that provides an immersive environment. As referred to herein, an immersive environment is an environment in which, when immersed, the user may not be able to view, hear, or focus on the environment or events occurring in the environment outside the immersive environment, i.e., in the real world. One example of such an immersive environment is the environment formed when a user is using a virtual reality headset that wraps around the user's head, thereby making it not possible for the user to hear, view, or focus on their surroundings while immersed, such as in a virtual game or experience, inside their virtual reality headset.

The input received from the user device includes instructions for what constitutes a trigger and instructions for a predetermined desired response to the trigger. In other words, the input includes a condition, and if the condition is satisfied, thereby acting as a trigger for the system, such as the system in FIG. 2, the system automatically executes a predetermined/pre-uploaded response to the trigger.

The input received, i.e., what constitutes a trigger and a desired response to the trigger, may be inputted by a user of the user device (also referred to as an immersive device). For example, a user via the user interface of the user device may indicate an "if this then that" (IFTTT) type of rule for the system to execute a response. An example of such an input may be if the train stops at Times Square, then display an alert on a screen of a user device. Another example may be if a flight attendant comes around near the user's seat offering drinks, display the type of drinks being offered on the user device's screen while the user is playing a virtual reality game wearing an immersive device. The input may also be automatically generated by control circuitry, such as control circuitry 220 and/or 228 of system 200 of FIG. 2, based on the surrounding environment. For example, the control circuitry 220 and/or 228, based on the user's daily commute to work, may automatically generate a trigger when the user is using the user device, where the trigger may be a location, e.g., Times Square, a routine job/work related stop for the user. For example, when the control circuitry 220 and/or 228 detects, based on the user device's GPS location, that Times Square is approaching on the train, then the control circuitry 220 and/or 228 may alert the user. The input may also be combination of a suggestion by the control circuitry 220 and/or 228 and approval or selection by the user of the user device. For example, based on monitoring the real-world environment surrounding the user device (such as within a predetermined vicinity of the user device), which may be inside an airplane, the control circuitry 220 and/or 228 may suggest to the user that a trigger and response relating to alerting the user when a flight attendant comes around be inputted via the user device. The control circuitry 220 and/or 228 may also provide a few suggestions of triggers and responses based on the surrounding environment for the user to select. When selected, such responses may be transmitted from the user device to a server for execution.

Figure 2:
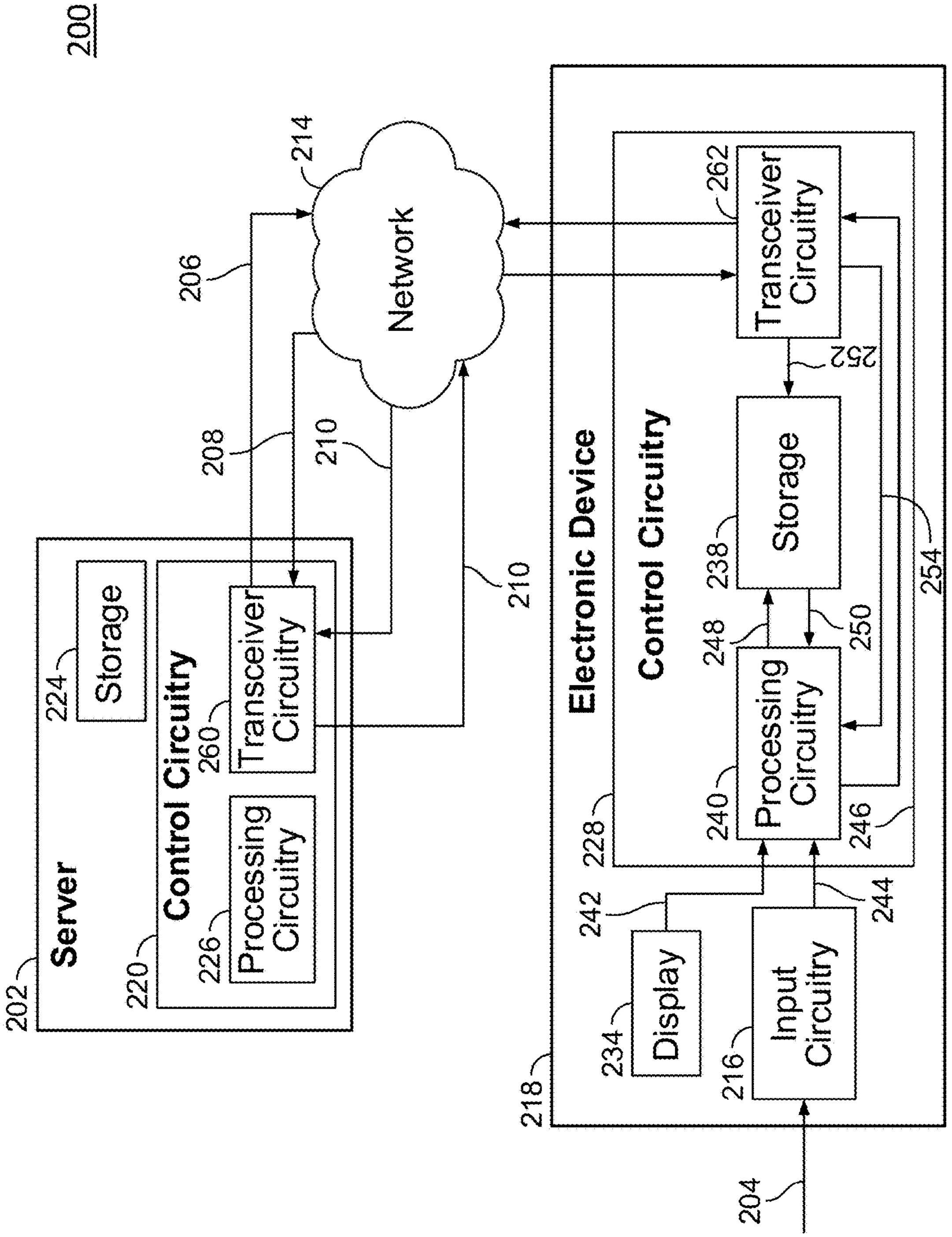
FIG. 2 is a block diagram of a system for providing awareness outside an immersive environment and executing responses to environmental triggers based on obtained sensor data, in accordance with some embodiments of the disclosure.

Once a trigger and a response, e.g., an IFTTT, relating to an occurrence of an event in the real world outside the virtual immersive environment and a predetermined response to the event have been received, such as by the server in FIG. 2, the server may then convert the received input into a textual output. Since the input may be received in any format, such as verbally by the user, via a keyboard or touchscreen input, user gestures, etc., the received input is transcribed into a textual output. The server may also leverage a model, such as an LLM, neural network, support vector machine (SVM) model, random forest, visual or audio model, etc., to understand and convert the received input into a textual output.

The server may also leverage the models to generate commands based on the received input, e.g., a command that would instruct the control circuitry 220 and/or 228 to monitor for the trigger and upon occurrence of the trigger automatically provide the predetermined/pre-uploaded response.

Having been equipped with information relating to a trigger (which is related to an environmental event) and the predetermined response to the trigger, the user device may monitor the environment surrounding the user device. This may be the real-world environment outside the user device and outside the immersive environment of the user device. The monitoring may include using on-device sensors of the user device, such as a camera, microphone, global positioning system (GPS), temperature sensor, heartbeat sensor, etc., to monitor the environment surrounding the user device. The monitoring may also include using sensors that are not on the user device but are wirelessly connected to the user device to monitor the environment surrounding the user device. The sensors may also be any sensors from which the collected information can be transmitted to the user device. The sensors may also be associated with the user device by wirelessly connecting to the user device through an intermediary device, such as hub. The sensors may also be part of a peer-to-peer network in which information obtained from a remote sensor may be transmitted to the user device using the peer-to-peer network. As such either the sensors from the user device's surrounding (e.g., within a predetermined distance of the user device) or the sensors of a remote device's surrounding (e.g., within a predetermined distance of the remote user's device) may perform the monitoring and transmit the data to the user device or a server associated with the user device for further processing. The area monitored may be determined as needed such that not the whole world is monitored, just what needs to be monitored based on the trigger.

The information/data obtained by the sensors may then be fed as input into a model, such as an LLM, neural network, SVM, visual or audio model. The model may be leveraged to generate a textual output. In some embodiments, a network may be cascaded to form an LLM and then be used to perform the processing described herein. For example, cascading models, such as STT and object identification/tracking may be used to form the LLM. In yet other embodiments, the LLM may be a multi-modality LLM that can process text, audio, image and video input and output text, image, audio, and video. Such LLMs may be pre-trained to handles all types of multi-modalities. As such, in such an embodiment, where the LLM is a multi-modality LLM, cascading from a network to generate an LLM may not be needed.

If the model used is an LLM model, similar to inputting a prompt in an LLM, such as ChatGPT™, Gemini™, or Llama™, which may include instructions on how to analyze the input or what format of output is desired, the sensor information/data obtained by the sensors may also be fed into the LLM. Along with sensor data, what constitutes the trigger and desired response to the trigger may also be inputted into the LLM. The LLM may determine which data to be used, such as whether to use data from a visual, audio, GPS, temperature, or other sensor based on what constitutes the trigger and the desired response to the trigger received. For example, if the trigger relates to an audio environmental event, then the LLM may use only data obtained from the audio sensors. It may also use data obtained from other sensors if it relates to the audio event. For example, if the trigger condition for which to monitor is an audio trigger for a flight attendant asking for which drink the user may like or a subway train announcement of Times Square, then data from sensors that provide audio data may be used for processing by the LLM. In some instances, multiple types of sensor data may be relevant to an environmental event, such as a train arriving at Times Square, e.g., GPS data relating to the location of the train, visual data that may include signs at the train station where the train has stopped, or the audio data that relates to a train announcement, and thus may be used for processing by the LLM. In yet other embodiments, when a determination is made that the type of data needed is audio data, then other type of data, such as visual sensor data may not even be collected to save memory and processing resources.

The LLM may select the data from one or more sensors that has been inputted into the LLM to generate a textual output. The LLM may apply various data analysis techniques, such as deep learning, data classification, data clustering, text analysis (using natural language processing), regression analysis, sentiment analysis, etc., to analyze the received sensor input data.

The LLM may perform the analysis to detect whether the trigger condition has been met. Using the example above, the LLM may be leveraged to detect if the flight attendant is asking for drink orders, whether the person is actually a flight attendant, or whether the flight attendant is asking for drink orders as opposed to performing another function. In other words, the LLM may be leveraged to determine an answer to a question: Is the trigger condition met? For example, if the trigger condition is the occurrence of the event of the flight attendant coming through the airplane aisle with a beverage cart asking passengers for drink orders, then the LLM, based on the sensor input relating to the monitoring of the area surrounding of the user's device, which is fed into the LLM as input, may use the data on which the LLM is trained to perform an analysis to determine if that trigger condition is met. The LLM's textual output may describe the event that occurred.

The textual output from the LLM (or any other model) may be normalized such that it is in the same textual form as the textual output of the trigger received (such that an apples-to-apples comparison of text in the same format may be made).

The textual output from the LLM (or any other model) may then be semantically matched with the textual output of the trigger received. The quality of the match may be rated in terms of its confidence value, such as on a scale of low to high confidence, on a 1-10 confidence scale, or a scale with some other denomination.

In some embodiments, the semantic matching may be performed after the textual output from the model, and in other embodiments, the model itself may perform both the textual output and the semantic matching. What tasks to perform may depend on the prompt given to the model. For example, an LLM may be instructed, via a prompt, to output a textual description of the sensor data as well as to determine whether there is a semantic match between the textual output and the trigger condition.

The predetermined response to the trigger, which was received from the user device, may be executed if a semantic match between the textual output from the LLM (or any other model) and the textual output of the trigger received is determined, in other words, if the event that actually occurred, i.e., determined based on the monitoring by the sensors, is the same type of event for which the trigger was created. Using the flight attendant example, the event that actually occurred, which is the flight attendant saying "Mam, would you like anything to drink?" is what the user desired as a trigger to execute the action/response. The predetermined action/response, in this example, may be to switch to pass-through in the AR device such that the user can see the flight attendant and interact with them to request the type of drink desired. The predetermined action/response, in this example, may also be for the control circuitry 220 and/or 228 to display a menu of all the drinks that are being offered, which may be obtained based on a camera sensor input of the beverage cart.

The predetermined response may also vary based on the confidence level. For example, the user may desire to have the control circuitry 220 and/or 228 provide a different response if the confidence level is high than a response when the confidence level is low. For example, if a high confidence level is determined, the user may have inputted a predetermined response to pause the immersive game and switch from AR to pass-through. This is because, if the user is certain with a high confidence that the flight attendant is near him/her and offering drinks, then the user may want to interact with the flight attendant and as such switch to pass-through from AR.

On the other hand, if a low confidence level is determined, i.e., that a lower confidence that the trigger has been met, the user may have inputted a predetermined response to display a drink menu. Such a predetermined response may be inputted because the user rather continues playing their immersive game if it is uncertain if the flight attendant is actually near him/her or offering drinks. If the system may also have the capability to further analyze the trigger and look for false, positives. For example, the system may perform additional detection or analysis to determine if the initial determination was accurate and if not, then remove the system may allow the user to continue to be immersed and not take any action.

Referring to the figures, FIG. 1 is a block diagram of a process 100 for providing awareness outside an immersive environment and executing responses to environmental triggers based on obtained sensor data, in accordance with some embodiments of the disclosure. The process 100 may be implemented, in whole or in part, by systems or devices such as those shown in FIGS. 2-3. One or more actions of the process 100 may be incorporated into or combined with one or more actions of any other process or embodiments described herein. The process 100 may be saved to a memory or storage (e.g., any one of those depicted in FIGS. 2-3) as one or more instructions or routines that may be executed by a corresponding device or system to implement the process 100.

In one embodiment, at block 101, a user may be using a user device. The user device may be an immersive device capable of providing an immersive environment for the user. As referred to herein, an immersive environment is an environment in which, when immersed, the user may not be able to view, hear, or focus on the environment or events occurring in the environment outside the immersive environment, i.e., in the real world. Such devices capable of providing an immersive environment may include an extended reality (XR) device, smart earbuds, smartwatch, smartphone, smart glasses, laptop, gaming device, or any other device that focuses the user's attention on the media asset, content item, audio file, or any other type of content that is displayed or audibly provided to the user via the user device.

When the device creates such an immersive environment, the user is likely immersed in the immersive environment created and likely may not be able to focus on the environment outside the user device, or their level of focus, such as to other visuals, audio, and movements surrounding them, may be low. Accordingly, the methods described herein of providing awareness, determining triggers, and automatically taking action for the determined triggers when the user is immersed may be applied to all such user devices.

One example of such an immersive device that is capable of providing an immersive environment is an XR device. The XR device, such as a virtual reality, augmented reality, or mixed reality headset, is a device that may be worn by a user. The XR headset may be a head-mounted extended reality device that can be worn by a user by wrapping it around their head, or some portion of their head, and in some instances, it may be all-encompassing of the head and the eyes of the user. It may allow the user to experience virtual reality games and other experiences. while the user is experiencing such virtual reality experiences, i.e., is immersed in the immersive environment, either the user may not be able to focus on the environment outside the headset or their level of focus may be low.

In some embodiments, the XR device may be a non-headset device. For example, the XR device may be a wearable device, such as smart glasses which is not all encompassing like the headset with control circuitry, that allows the user to see through a transparent glass to view the real-world around them, using an optical or a video see-through functionality. In other embodiments, the XR device may be a mobile phone having a camera and a display to intake the live feed input and display it on a display screen of the mobile device. The devices mentioned may, in some embodiments, include both a front-facing or inward-facing camera and an outward-facing camera. The front-facing or inward-facing camera may be directed at the user of the device, while the outward-facing camera may capture the live images in its field of view. The devices mentioned above, such as smart glasses, mobile phones, virtual reality headsets, and the like, may be referred to herein as XR devices, user devices, immersive devices, or XR headsets.

Another example of such an immersive device that is capable of providing an immersive environment is smart earbuds. When a user is wearing smart earbuds and listening to music, a podcast, or some other content, the user is immersed in the immersive environment created and likely may not be able to focus on the environment outside the earbuds, or their level of focus may be low, such as to other sounds, speech, and noises outside the smart earbuds. This may be because the audio of the earbuds may overlap with outside sounds or be much more powerful than the sounds outside. Accordingly, the methods described herein of providing awareness when the user is immersed may be applied to such smart earbuds type devices as well.

Another example of such an immersive device that is capable of providing an immersive environment is a mobile phone or a laptop. When a user is using a smartphone, laptop, tablet, or another display device and working on something, watching a video, listening to music, playing a game, such as a virtual reality game, or performing a detailed task, the user is likely immersed in the immersive environment created and may not be able to focus on the environment outside the device, or their level of focus, such as to other visuals, audio, and movements surrounding the user, may be low. Accordingly, the methods described herein of providing awareness when the user is immersed may be applied to such type of display devices as well.

There may be many use cases for providing awareness by determining triggers and automatically acting in response to the determined triggers when the user is immersed. Some examples of use cases are described in FIGS. 6A-D. Other use cases may include, but are not limited to, a trigger for notifying the user when a certain destination is reached, such as while the user is traveling in a bus or train and is immersed in an immersive environment. Another use case may be a trigger for notifying the user when a sports team scores, while the user is at the sports event but immersed in an immersive environment. Yet another use case may be a trigger for notifying the user when another person is approaching the user or speaking to the user, when the user is immersed in an immersive environment. Another use case may be a trigger for notifying the user when something relevant concerning the user is spoken and distinguishing it from other chatter, when a user is among several people and wants to be notified only if something relevant to him/her is spoken while the user is immersed in an immersive environment. In this embodiment, audible sensor input may be inputted into an LLM to detect if the triggering event has occurred by distinguishing between speech that is and is not relevant to the user, and then an action or predetermined response may be activated if the trigger is met. Additional use cases, i.e., event triggers and predetermined responses as depicted in block 101, include a trigger for notifying the user when a car is approaching the user while the user is immersed in an immersive environment. In each of these use cases in block 101, a trigger is satisfied, i.e., a detection is made, such as via leveraging the LLM and its analysis of monitored sensor data of the environment.

At block 102, once the trigger event or trigger condition and the predetermined response to the trigger event are received, they are used as input into an LLM to generate a textual output. The instructions for the triggering event/condition and the predetermined response may be in many forms, e.g., simple to more complex or tiered triggers, where multiple conditions need to occur for the trigger to be satisfied. The instructions for the trigger and response may also be in different forms varying from complex audio to visual input forms (e.g., user speaking or gesturing the trigger and response input). The control circuitry 220 and/or 228 when receiving an input may utilize techniques to transform the received input to pure natural language which can then be used as an input into the LLM.

More specifically, in some embodiments, a natural language understanding (NLU) engine or component may be used to analyze the input that has been transformed to pure natural language, e.g., to transcribed text, to delineate the received input/command into two main parts: the trigger (the condition or event that must be detected) and the desired response (the action the system should take when condition is met).

Figure 6A:
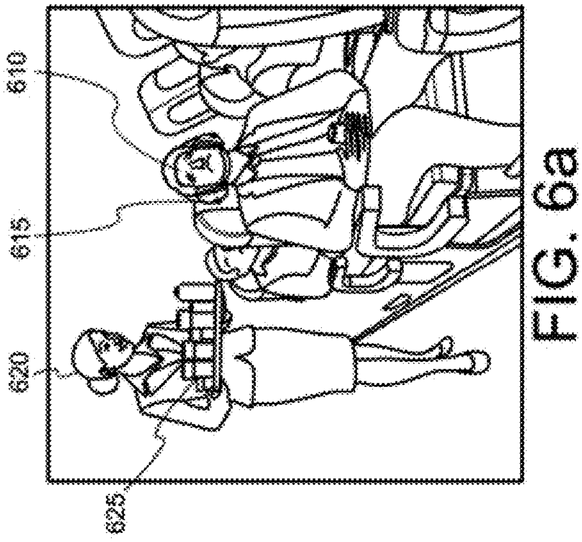
FIGS. 6A-6D are exemplary use cases of immersive environments created via a user device, in accordance with some embodiments of the disclosure.

For instance, as depicted in FIG. 6A, an input relating to the trigger and response may be for a use case in which the user is immersed in an immersive environment, such as by wearing smart headphones, which may minimize their ability to hear events outside the headphones and wants to be informed when the flight attendant is approaching with drinks. The user, for example, may input the command "Alert me when the flight attendant is near," and as such the trigger language may be identified as "The flight attendant is near," and the response may be identified as "Alert me." In some embodiments, the NLU engine or component may be used for parsing the received input or commands into "trigger" and "response" parts. The NLU may leverage a model, such as an LLM, to perform the parsing by structuring a pre-defined prompt template that guides the LLM to dissect the command into its constituent elements. The template may be phrased as follows: "Given the command: [customer command], identify and categorize it into two distinct parts: the 'trigger,' which specifies the condition or event to be detected, and the 'response,' detailing the action the system is to execute upon trigger detection." The template may also provide an instruction to the LLM to format the output in JSON, with two key fields: "trigger" and "response." It may further instruct the LLM to mark as "N/A" if either component is indiscernible. This instruction-based input into the LLM is analogous to querying LLMs such as ChatGPT Gemini, Llama, or other types of LLMs, providing instructions on the approach to take or the type of output desired, and let the LLM provide an answer to the query using any type of LLM processing techniques (e.g., deep learning, etc.). The structured query approach ensures that the LLM processes the command with a clear understanding of the task requirements, facilitating accurate and efficient extraction of the trigger and response elements from natural language inputs.

In some embodiments, the trigger part may be analyzed to see whether the system needs to monitor audio and/or visual cues for the trigger. This, again, may be implemented using an LLM with a pre-defined prompt template and providing instructions to the LLM, such as, for example:

Analyze the provided trigger "[custom trigger]" to determine the necessary sensory monitoring required.

Determine whether this trigger pertains to auditory cues, visual cues, or a combination of both for effective detection.

Structure your analysis to output "audio," "visual," or "both."

Based on the LLM's analysis, in some embodiments, the control circuitry 220 and/or 228, at block 103, may determine which sensor's data to use for further processing. For example, if the trigger would be satisfied by audio data that is obtained by a sensor based on monitoring the real-world environment outside the immersive environment, then, although various forms of data from a plurality of sensors may be obtained, only the audio data may be used for further processing. In other embodiments, based on the LLM's analysis, the control circuitry 220 and/or 228, at block 103, may dynamically assign the environmental monitoring task to the appropriate sensor(s) available within the device. For instance, devices such as AirPods™, equipped solely with audio sensors, will be assigned audio-based monitoring tasks, whereas an XR headset, which houses both audio and visual sensors, can handle triggers requiring either or both audio and visual sensory inputs.

The sensory inputs, which are inputs based on the monitoring of the real-world environment surrounding the immersive device (such as within a predetermined distance or vicinity of the user device), may be obtained from either on-device sensors, off-device sensors, or a combination of both. Examples of on-device sensors, such as for an XR device, may be a camera or a microphone. On-device sensors for a smartwatch may be a GPS, temperature sensor, heartbeat sensor, etc. The type of on-device sensors may vary based on the type of user device used. Some examples of off-device sensors may include cameras, speakers, motion sensors, or GPS that are not on the user device but wirelessly connected to the user device to monitor the environment surrounding the user device.

At block 104, the sensory data obtained by the sensors by monitoring the environment outside the user device may then be fed as input into a model, such as an LLM, neural network, SVM, visual or audio model. The model may be leveraged to generate a textual output. As described earlier, instructions that vary from broad instructions to specific instructions, such as the type of analysis to perform or the format of the output desired, may be provided to the model, such as the LLM. The model may then apply various data analysis techniques, such as deep learning, data classification, data clustering, text analysis (using natural language processing), regression analysis, sentiment analysis, etc., to analyze the received sensor input data. Put simply, the model may detect if the trigger condition is met.

At block 105, the output from the model, such as the LLM, which is a textual output, may be normalized to the same format as the textual output of the trigger received from the user device at block 101.

At block 106, the textual output from the LLM (or any other model) may then be semantically matched with the textual output of the trigger received. The quality of the match may be rated in terms of its confidence value, such as on a scale of low to high confidence, on a 1-10 confidence scale, or a scale with some other denomination. Semantic matching may be performed after the textual output from the LLM or may be performed by the LLM—e.g., the LLM may be instructed to perform both the textual output describing the sensor data and then use that data to semantically match it with the trigger and provide a result of the match. Semantic matching components such as form, context, topic, image similarity, taxonomy structure, key properties, description of both the trigger received from the device and monitored data from the sensor may be analyzed to determine whether the triggering event has actually occurred.

At block 107, if a determination is made that the trigger event has occurred (e.g., trigger condition is satisfied), then the instructions for the predetermined response, which were also received by the user device, may be executed. In some embodiments, different predetermined responses may be executed based on the confidence level of the trigger condition being satisfied. For example, the response for a low confidence level may be different from the response for a high confidence level when the trigger is satisfied.

Some examples of the responses, when the trigger condition is met, may include change device settings from VR to AR, obtain a list and display on screen of the user device, provide an audio response to another person in the vicinity of the user device using the user device's speakers, provide a visual response, such as displaying something on a screen of the user device that can be seen outside the user device, and pause the media asset/game being played on the user device. In some embodiments, once a trigger condition is satisfied, an automatic response may be present which may include sending out, through the attached speaker or a message on the outfacing display of the headset, a message to another person (e.g., "Please alert me when drinks are being served," or "Please give me orange juice").

In some embodiments, a response to an anticipated event may be automatically configured. For example, showing the response of "I need some water" after calling the attendant on a flight, allows the user to start to play games or continue to be immersed in the immersive environment on the user device so that when the attendant comes to the user's seat, the attendant will not need to disturb the user.

In yet another embodiment, the trigger may be location-based, and an example of a response to when the location-based trigger is satisfied may be to alert the user to arrival at a location. For example, if the user immersed in the immersive environment is traveling, such as on a bus, train, taxi, plane, or another type of vehicle, the user may want to be alerted when the destination is reached or a few minutes or a few miles before the destination is reached such that the user can pack up or do whatever else they need to do to disembark at the destination. For example, the user may say, "Alert me when the bus arrives at (a certain location)." Since the immersive device, such as a smartwatch, smartphone, or headset, may have a GPS sensor and be able to interpret the verbal command and alert the user when approaching the destination, when the trigger condition is met, e.g., the destination is almost reached, the desired response may be activated.

In another embodiment, an example of a response may be to alert a user that has hearing loss or impaired vision in a way that may be suited for a person with such disabilities.

In some embodiments, the control circuitry 220 and/or 228 may use a machine learning (ML) engine executing an ML algorithm to detect patterns of triggers and responses based on the type of environment. Leveraging ML data, the control circuitry 220 and/or 228 may be able to learn from the user's behavior, i.e., the setting of customized alerts and responses, over time, and thus be able to automatically prioritize and suggest customizations. For example, if the user commutes to work using public transportation and gets off at the same station daily, and during commute is immersed in an immersive environment (e.g., playing games) on their phone, then the control circuitry 220 and/or 228 may automatically create a trigger and response based on user history and implement such response when the trigger is satisfied.

In some embodiments, the control circuitry 220 and/or 228 may collaborate with public safety organizations or transportation authorities to integrate real-time emergency alerts with user's customized response. For example, if the user usually gets off a train at Times Square, but the station is closed, the control circuitry 220 and/or 228 may obtain such data and alert the user to get off the train a stop earlier and provide a detour to the usual work destination. In another example, if an emergency, such as a police, fire, or medical emergency occurs, then the control circuitry 220 and/or 228 may automatically alert the user that is immersed in the immersive environment, such as by using a default response or a customized response based on user preferences.

In some embodiments, the user may command multiple scenarios and corresponding responses, and the control circuitry 220 and/or 228 may automatically utilize these to intervene and interact with the environment before it needs to notify the user. In an additional embodiment, the control circuitry 220 and/or 228 may learn from the past and build up the scenario and response knowledge base and based on them automatically interact with the environment on behalf of the user, so that the user can be uninterrupted and continue to enjoy the immersive experience. For example, the control circuitry 220 and/or 228 may use a chatbot to interact with the environment on behalf of the user.

In yet another embodiment, the control circuitry 220 and/or 228 may recognize the environment type and provide candidate scenarios and corresponding responses for the user to choose from, and the recommendation of these scenarios may be based on many factors, including the user's historical actions, command setups, and actions by other users, such as the current user's friends, colleagues, and family.

In yet another embodiment, the control circuitry 220 and/or 228 may collaborate with the nearby systems to monitor the environment together and provide a better description of the environment and enhance the performance collectively. For example, the control circuitry 220 and/or 228 may collaborate with weather, traffic, and other systems to provide a better description of the road ahead if the user is immersed in the immersive environment.

In an additional embodiment, the user may subscribe to suggestions for what to monitor and how to respond. Such suggestions may be based other people's settings (if those are published by the others) or a database of such triggers and responses collected for the specific situation.

Figure 3:
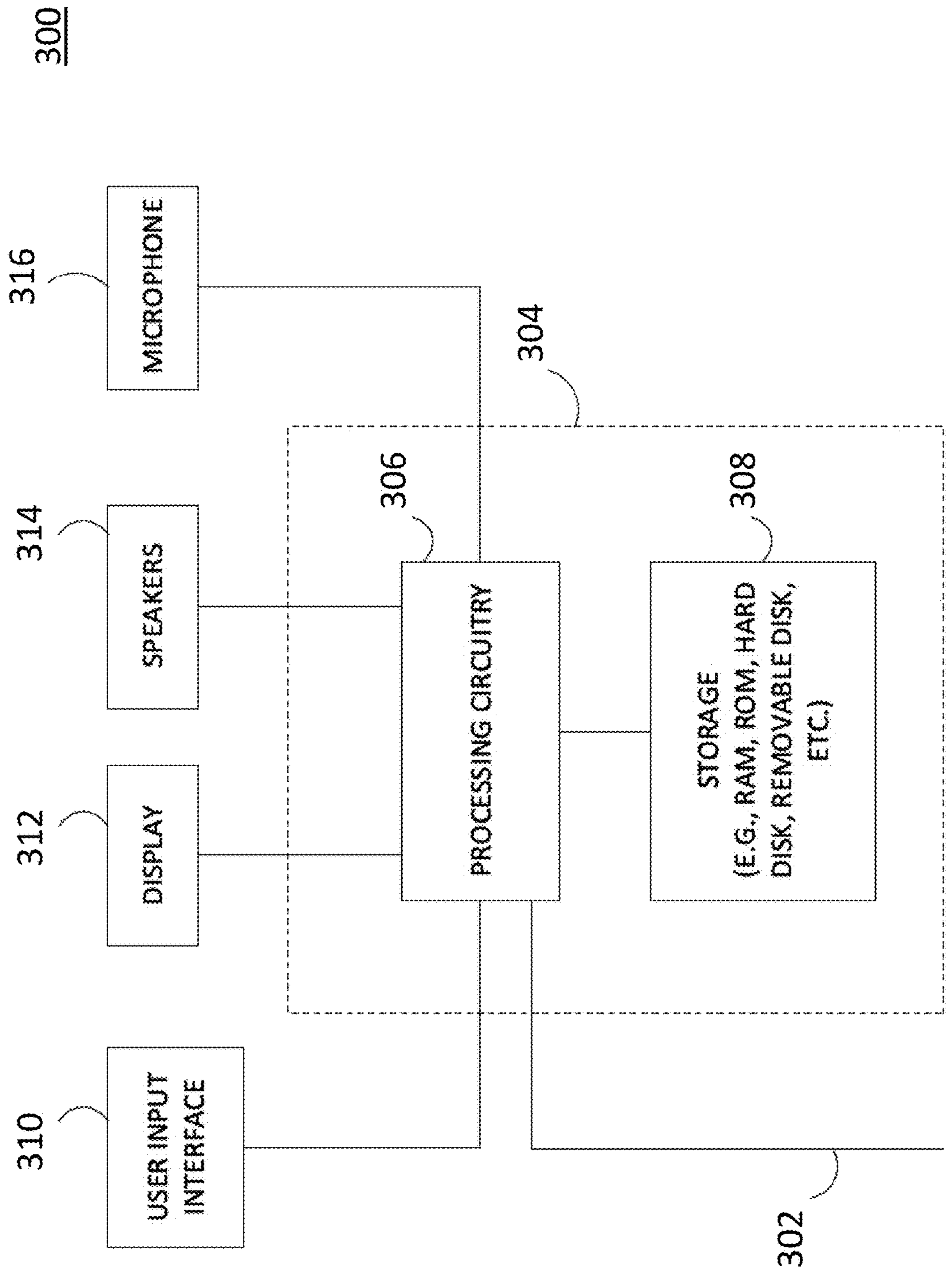
FIG. 3 is a block diagram of a user device, in accordance with some embodiments of the disclosure.

FIG. 2 is a block diagram of a system for providing awareness outside an immersive environment and executing responses to environmental triggers based on obtained sensor data, in accordance with some embodiments of the disclosure and FIG. 3 is a block diagram of a user device, in accordance with some embodiments of the disclosure.

FIGS. 2 and 3 also describe exemplary devices, systems, servers, and related hardware that may be used to implement processes, functions, and functionalities described in relation to FIGS. 1 and 4-10. Further, FIGS. 2 and 3 may also be used for providing awareness outside an immersive environment for a user who is immersed in the immersive environment, monitoring the environment outside the immersive environment, obtaining sensor data from the monitoring, leveraging a large language model (LLM) to generate a textual output for the obtained sensor data, executing an action/response if an event occurring outside the immersive environment relates to an event trigger, receiving an input from a user device, wherein the input are instructions or description of a trigger event and a response to the trigger event, receiving an IFTTT rule from the user to be used as a trigger event and a response to the trigger event, providing suggestion of a trigger and response the trigger event for selection by the user device, converting user input, sensor input, into textual outputs, i.e. describing in text the inputs from user, sensors, and any monitoring input, leveraging neural networks, LLM models, to detect occurrence of the trigger event, determining which sensor data to be used (e.g., audio, visual, location, etc.), performing semantic matching of the trigger provided by the user and the trigger condition detected by monitoring the environment, where the semantic matching includes matching textual data/description of the trigger provided by the user and the trigger condition detected by monitoring the environment, rating the quality of the semantic match in terms of its confidence value, associating a different response for each type of confidence value, and performing functions related to all other processes and features described herein.

In some embodiments, one or more parts of, or the entirety of system 200, may be configured as a system implementing various features, processes, functionalities and components of FIGS. 1, and 4-10. Although FIG. 2 shows a certain number of components, in various examples, system 200 may include fewer than the illustrated number of components and/or multiples of one or more of the illustrated number of components.

System 200 is shown to include a computing device 218, a server 202 and a communication network 214. It is understood that while a single instance of a component may be shown and described relative to FIG. 2, additional instances of the component may be employed. For example, server 202 may include, or may be incorporated in, more than one server. Similarly, communication network 214 may include, or may be incorporated in, more than one communication network. Server 202 is shown communicatively coupled to computing device 218 through communication network 214. While not shown in FIG. 2, server 202 may be directly communicatively coupled to computing device 218, for example, in a system absent or bypassing communication network 214.

Communication network 214 may comprise one or more network systems, such as, without limitation, an internet, LAN, WIFI or other network systems suitable for processing applications, including application to receive trigger and response descriptions and convert them to textual output, receive sensor monitoring data and convert it to textual output, normalize both the textual output and use then to determine a semantic match. In some embodiments, system 200 excludes server 202, and functionality that would otherwise be implemented by server 202 is instead implemented by other components of system 200, such as one or more components of communication network 214. In still other embodiments, server 202 works in conjunction with one or more components of communication network 214 to implement certain functionality described herein in a distributed or cooperative manner. Similarly, in some embodiments, system 200 excludes computing device 218, and functionality that would otherwise be implemented by computing device 218 is instead implemented by other components of system 200, such as one or more components of communication network 214 or server 202 or a combination. In still other embodiments, computing device 218 works in conjunction with one or more components of communication network 214 or server 202 to implement certain functionality described herein in a distributed or cooperative manner.

Computing device 218 includes control circuitry 228, display 234 and input circuitry 216. Control circuitry 228 in turn includes transceiver circuitry 262, storage 238 and processing circuitry 240. In some embodiments, computing device 218 or control circuitry 228 may be configured as electronic device 300 of FIG. 3.

Server 202 includes control circuitry 220 and storage 224. Each of storages 224 and 238 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 4D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 224, 238 may be used to store triggers and response instructions, sensor data obtained by monitoring the environment, semantic matches made, confidence values/levels associated with the semantic matches, different responses associated with each confidence value, AI and ML algorithms, and LLMs. Non-volatile memory may also be used (e.g., to launch a boot-up routine and other instructions). Cloud-based storage may be used to supplement storages 224, 238 or instead of storages 224, 238. In some embodiments, data relating to triggers and response instructions, sensor data obtained by monitoring the environment, semantic matches made, confidence values/levels associated with the semantic matches, different responses associated with each confidence value, and data obtained from AI, ML, and LLM algorithms, and data relating to all other processes and features described herein, may be recorded and stored in one or more of storages 212, 238.

In some embodiments, control circuitry 220 and/or 228 executes instructions for an application stored in memory (e.g., storage 224 and/or storage 238). Specifically, control circuitry 220 and/or 228 may be instructed by the application to perform the functions discussed herein. For example, the control circuitry 220 and/or 228 may be instructed by the application to automatically provided a predetermined trigger response when a detection is made that the trigger condition is satisfied. In some implementations, any action performed by control circuitry 220 and/or 228 may be based on instructions received from the application. For example, the application may be implemented as software or a set of executable instructions that may be stored in storage 224 and/or 238 and executed by control circuitry 220 and/or 228. In some embodiments, the application may be a client/server application where only a client application resides on computing device 218, and a server application resides on server 202.

The application may be implemented using any suitable architecture. For example, it may be a stand-alone application wholly implemented on computing device 218. In such an approach, instructions for the application are stored locally (e.g., in storage 238), and data for use by the application is downloaded on a periodic basis (e.g., from an out-of-band feed, from an internet resource, or using another suitable approach). Control circuitry 228 may retrieve instructions for the application from storage 238 and process the instructions to perform the functionality described herein. Based on the processed instructions, control circuitry 228 may determine a type of action to perform in response to input received from input circuitry 216 or from communication network 214. For example, in response to determining a semantic match, i.e., that the textual output relating to the occurrence of the trigger event (which is obtained from one or more sensors) matches the textual output of the trigger condition provided by the user or system, the control circuitry 228 may automatically execute the predetermined trigger response.

In client/server-based embodiments, control circuitry 228 may include communication circuitry suitable for communicating with an application server (e.g., server 202) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 214). In another example of a client/server-based application, control circuitry 228 runs a web browser that interprets web pages provided by a remote server (e.g., server 202). For example, the remote server may store the instructions for the application in a storage device. The remote server may process the stored instructions using circuitry (e.g., control circuitry 228) and/or generate displays. Computing device 218 may receive the displays generated by the remote server and may display the content of the displays locally via display 234 or the user's XR device. This way, the processing of the instructions is performed remotely (e.g., by server 202) while the resulting displays, such as the display windows described elsewhere herein, are provided locally on computing device 218. Computing device 218 may receive inputs from the user via input circuitry 216 and transmit those inputs to the remote server for processing and generating the corresponding displays. Alternatively, computing device 218 may receive inputs from the user via input circuitry 216 and process and display the received inputs locally, by control circuitry 228 and display 234, respectively.

Server 202 and computing device 218 may transmit and receive content and data such as data relating to triggers and response instructions, sensor data obtained by monitoring the environment, semantic matches made, confidence values/levels associated with the semantic matches, different responses associated with each confidence value, and data obtained from AI, ML, and LLM algorithms. Control circuitry 220, 228 may send and receive commands, requests, and other suitable data through communication network 214 using transceiver circuitry 260, 262, respectively. Control circuitry 220, 228 may communicate directly with each other using transceiver circuits 260, 262, respectively, avoiding communication network 214.

It is understood that computing device 218 is not limited to the embodiments and methods shown and described herein. In nonlimiting examples, computing device 218 may be a primary device, a personal computer (PC), a laptop computer, a tablet computer, a WebTV box, a personal computer television (PC/TV), a PC media server, a PC media center, a handheld computer, a mobile telephone, a smartphone, a virtual, augment, or mixed reality device, or a device that can perform function in the metaverse, or any other device, computing equipment, or wireless device, and/or combination of the same capable of suitably allowing a user to be immersed in the immersive environment (via their XR device) and at the same time receive alerts of their surroundings when a trigger condition is met.

Control circuitry 220 and/or 218 may be based on any suitable processing circuitry such as processing circuitry 226 and/or 240, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 220 and/or control circuitry 218 are configured to implement a process for providing awareness outside an immersive environment for a user who is immersed in the immersive environment, monitoring the environment outside the immersive environment, obtaining sensor data from the monitoring, leveraging a large language model (LLM) to generate a textual output for the obtained sensor data, executing an action/response if an event occurring outside the immersive environment relates to an event trigger, receiving an input from a user device, wherein the input are instructions or description of a trigger event and a response to the trigger event, receiving an IFTTT rule from the user to be used as a trigger event and a response to the trigger event, providing suggestion of a trigger and response the trigger event for selection by the user device, converting user input, sensor input, into textual outputs, i.e. describing in text the inputs from user, sensors, and any monitoring input, leveraging neural networks, LLM models, to detect occurrence of the trigger event, determining which sensor data to be used (e.g., audio, visual, location, etc.), performing semantic matching of the trigger provided by the user and the trigger condition detected by monitoring the environment, where the semantic matching includes matching textual data/description of the trigger provided by the user and the trigger condition detected by monitoring the environment, rating the quality of the semantic match in terms of its confidence value, associating a different response for each type of confidence value, and performing functions related to all other processes and features described herein.

Computing device 218 receives a user input 204 at input circuitry 216. For example, computing device 218 may receive a user input like description of a trigger condition and its response.

Transmission of user input 204 to computing device 218 may be accomplished using a wired connection, such as an audio cable, USB cable, ethernet cable or the like attached to a corresponding input port at a local device, or may be accomplished using a wireless connection, such as Bluetooth, WIFI, WiMAX, GSM, UTMS, CDMA, TDMA, 3G, 4G, 4G LTE, or any other suitable wireless transmission protocol. Input circuitry 216 may comprise a physical input port such as a 3.5 mm audio jack, RCA audio jack, USB port, ethernet port, or any other suitable connection for receiving audio over a wired connection or may comprise a wireless receiver configured to receive data via Bluetooth, WIFI, WiMAX, GSM, UTMS, CDMA, TDMA, 3G, 4G, 4G LTE, or other wireless transmission protocols.

Processing circuitry 240 may receive input 204 from input circuit 216. Processing circuitry 240 may convert or translate the received user input 204 that may be in the form of voice input into a microphone, movement or gestures to digital signals, or translational or orientational movement of the extended reality headset. In some embodiments, input circuit 216 performs the translation to digital signals. In some embodiments, processing circuitry 240 (or processing circuitry 226, as the case may be) carries out disclosed processes and methods. For example, processing circuitry 240 or processing circuitry 226 may perform processes as described in FIGS. 1, 4, and 7-10, respectively.

FIG. 3 is a block diagram of a user device, in accordance with some embodiments of the disclosure. In an embodiment, the XR device 300, is the same equipment device 202 of FIG. 2. The XR device 300 may receive content and data via input/output (I/O) path 302. The I/O path 302 may provide audio content. The control circuitry 304 may be used to send and receive commands, requests, and other suitable data using the I/O path 302. The I/O path 302 may connect the control circuitry 304 (and specifically the processing circuitry 306) to one or more communications paths. I/O functions may be provided by one or more of these communications paths but are shown as a single path in FIG. 3 to avoid overcomplicating the drawing.

The control circuitry 304 may be based on any suitable processing circuitry such as the processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

In client-server-based embodiments, the control circuitry 304 may include communications circuitry suitable for providing awareness outside an immersive environment for a user who is immersed in the immersive environment, monitoring the environment outside the immersive environment, obtaining sensor data from the monitoring, leveraging a large language model (LLM) to generate a textual output for the obtained sensor data, executing an action/response if an event occurring outside the immersive environment relates to an event trigger, receiving an input from a user device, wherein the input are instructions or description of a trigger event and a response to the trigger event, receiving an IFTTT rule from the user to be used as a trigger event and a response to the trigger event, providing suggestion of a trigger and response the trigger event for selection by the user device, converting user input, sensor input, into textual outputs, i.e. describing in text the inputs from user, sensors, and any monitoring input, leveraging neural networks, LLM models, to detect occurrence of the trigger event, determining which sensor data to be used (e.g., audio, visual, location, etc.), performing semantic matching of the trigger provided by the user and the trigger condition detected by monitoring the environment, where the semantic matching includes matching textual data/description of the trigger provided by the user and the trigger condition detected by monitoring the environment, rating the quality of the semantic match in terms of its confidence value, associating a different response for each type of confidence value, and performing functions related to all other processes and features described herein.

Communications circuitry may be used to perform functions related to all other processes and features described herein, including those described and shown in connection with FIGS. 1, and 4-10.

The instructions for carrying out the above-mentioned functionality may be stored on one or more servers. Communications circuitry may include a cable modem, an integrated service digital network (ISDN) modem, a digital subscriber line (DSL) modem, in the cloud, a telephone modem, ethernet card, or a wireless modem for communications with other equipment, or any other suitable communications circuitry. Such communications may involve the internet or any other suitable communications networks or paths. In addition, communications circuitry may include circuitry that enables communication between XR device and associated sensors.

Memory may be an electronic storage device provided as the storage 308 that is part of the control circuitry 304. As referred to herein, the phrase "XR device," "electronic storage device," or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum-storage devices, gaming consoles, gaming media, or any other suitable fixed or removable storage devices, and/or any combination of the same. The storage 308 may be used to store triggers and response instructions, sensor data obtained by monitoring the environment, semantic matches made, confidence values/levels associated with the semantic matches, different responses associated with each confidence value, LLMs, AI and ML algorithms, and data relating to all other processes and features described herein. Cloud-based storage, described in relation to FIG. 3, may be used to supplement the storage 308 or instead of the storage 308.

The control circuitry 304 may include audio generating circuitry and tuning circuitry, such as one or more analog tuners, audio generation circuitry, filters or any other suitable tuning or audio circuits or combinations of such circuits. The control circuitry 304 may also include scaler circuitry for upconverting and down converting content into the preferred output format of the XR device 300. The control circuitry 304 may also include digital-to-analog converter circuitry and analog-to-digital converter circuitry for converting between digital and analog signals. The tuning and encoding circuitry may be used by the electronic device 300 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 308 is provided as a separate device from the XR device 300, the tuning and encoding circuitry (including multiple tuners) may be associated with the storage 308.

The user may utter instructions to the control circuitry 304, which are received by the microphone 316. The microphone 316 may be any microphone (or microphones) capable of detecting human speech. The microphone 316 is connected to the processing circuitry 306 to transmit detected voice commands and other speech thereto for processing. In some embodiments, voice assistants (e.g., Siri, Alexa, Google Home and similar such voice assistants) receive and process the voice commands and other speech.

The XR device 300 may include an interface 310. The interface 310 may be any suitable user interface, such as a remote control, mouse, trackball, keypad, keyboard, touch screen, touchpad, stylus input, joystick, or other user input interfaces. A display 312 may be provided as a stand-alone device or integrated with other elements of the electronic device 300. For example, the display 312 may be a touchscreen or touch-sensitive display or it may be the screen of the XR device. In such circumstances, the interface 310 may be integrated with or combined with the microphone 316. When the interface 310 is configured with a screen, such a screen may be one or more monitors, a television, a liquid crystal display (LCD) for a mobile device, active-matrix display, cathode-ray tube display, light-emitting diode display, organic light-emitting diode display, quantum-dot display, or any other suitable equipment for displaying visual images. In some embodiments, the display 312 may be a 3D display. The speaker (or speakers) 314 may be provided as integrated with other elements of electronic device 300 or may be a stand-alone unit. In some embodiments, the display 312 may be outputted through speaker 314.

The XR device 300 of FIG. 3 can be implemented in system 200 of FIG. 2 as primary equipment device 202, but any other type of user equipment suitable for allowing communications between two separate user devices for performing the functions related to implementing machine learning (ML) and artificial intelligence (AI) algorithms or using an LLM, and all the functionalities discussed associated with the figures mentioned in this application.

The XR device 300 of any other type of suitable user equipment suitable may also be used to implement ML and AI algorithms, and related functions and processes as described herein. For example, primary equipment devices such as XR devices may be used. Electronic devices may be part of a network of devices. Various network configurations of devices may be implemented and are discussed in more detail below.

Figure 4:
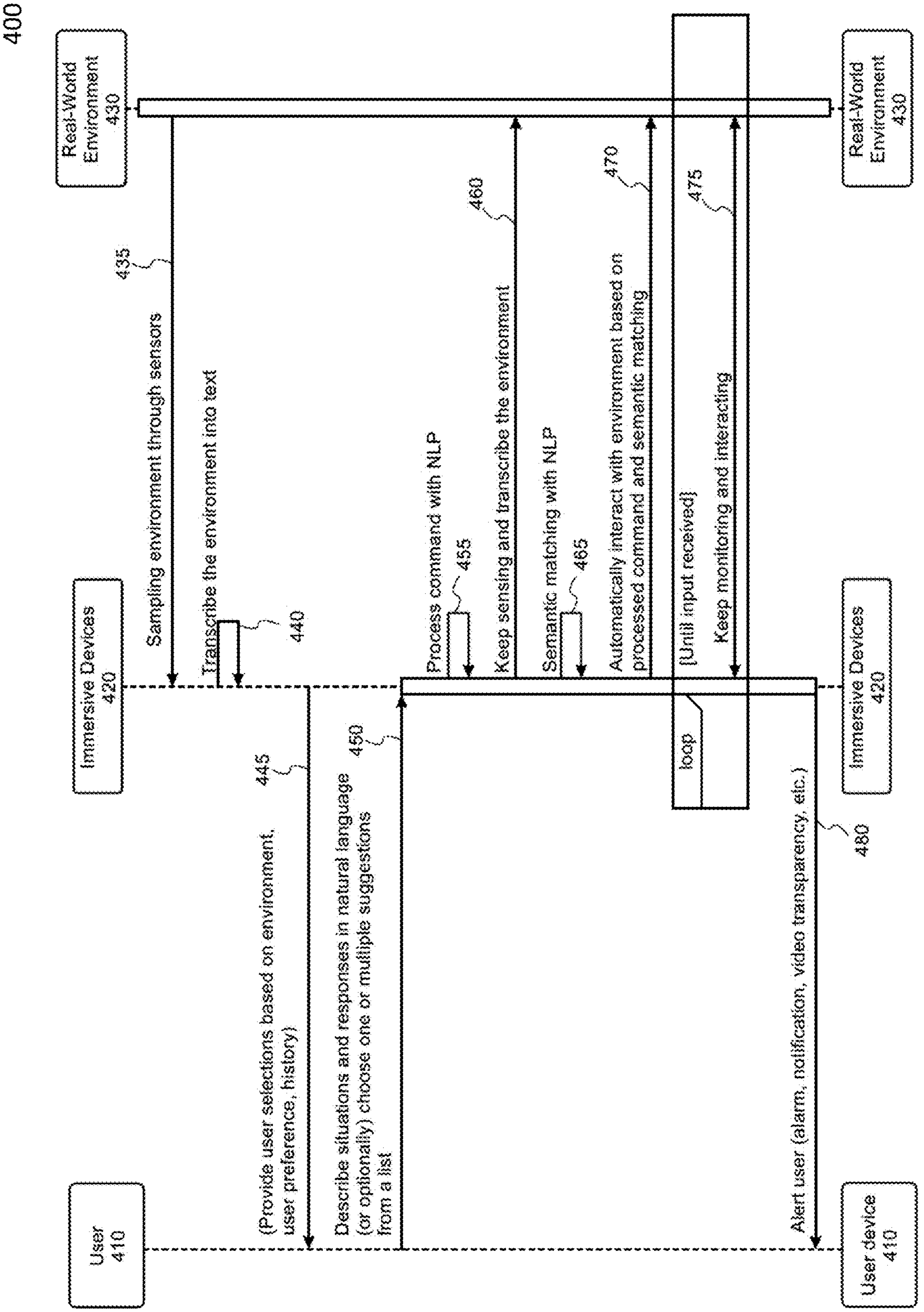
FIG. 4 is flow diagram of a process for providing awareness outside an immersive environment to the user and executing responses to environmental triggers based on obtained sensor data, in accordance with some embodiments of the disclosure.

FIG. 4 is flowchart of a process 400 for providing awareness to the user outside an immersive environment and executing responses to environmental triggers based on obtained sensor data, in accordance with some embodiments of the disclosure. The process 400 may be implemented, in whole or in part, by systems or devices such as those shown in FIGS. 2-3. One or more actions of the process 400 may be incorporated into or combined with one or more actions of any other process or embodiments described herein. The process 400 may be saved to a memory or storage (e.g., any one of those depicted in FIGS. 2-3) as one or more instructions or routines that may be executed by a corresponding device or system to implement the process 400.

In some embodiments, process 400 may be used to obtain triggers and responses (e.g., in a form of a user command or instructions), interpret user commands through speech recognition, understand context via natural language understanding (NLU), perform automatic language translation when needed, and utilize large multi-modality foundation models, such as an LLM, to both transcribe sampled audio and visual data into text descriptions and match the commands with natural language processing. The use of natural language to define trigger conditions may also allow for easier customization, enabling users to specify almost any conceivable scenario, without needing the system to pre-develop an algorithm to detect that specific situation.

More specifically, process 400, in one embodiment, may involve a user 410 engaged with their immersive device 420 (also referred to as a user device). When immersed, the user 410 may not be able to focus on the real-world environment 430 surrounding the immersive environment created by the immersive device 420.

In some embodiments, at 435, the control circuitry 220 and/or 228 samples the real-world environment, i.e., the environment surrounding the immersive device and outside the immersive environment created by the immersive device. The sampling is performed by using sensors that may be on the immersive device or sensors that are not on the immersive device but data from which can be obtained by the immersive device. For example, if the user device is an XR headset, it may be equipped with a sophisticated suite of sensors, including microphones and cameras, powered by advanced computational components.

In other embodiments, the environment surrounding the immersive device may be monitored after receiving an input of a trigger and a response to the trigger from the user via the immersive device. In this embodiment, guidance as to what is to be monitored in the real world may be derived from the inputted trigger received from the immersive device. For example, if the trigger is to alert the user when a certain sound is heard, then that would provide directions to monitor audible sounds in the vicinity of the immersive device. In another example, if the trigger is to alert the user when a flight attendant is seen, then that would provide direction to monitor visuals via a camera to determine if a flight attendant may be in the vicinity of the immersive device. In yet another example, if the trigger is to alert the user when a location is reached, then that would provide directions to monitor GPS location of the immersive device.

Referring back to the embodiment in which the environment is sampled through sensors at 435, once the sensor data is obtained, it may be transcribed into text at 440 and then a user selection may be recommended to the user at 445. The user selection recommended may be based on the type of environment monitored. For example, based on data from the sensors, if a determination is made that the sampled environment is inside of an airplane, then suggestions to the user may be to alert the user when a flight attendant is serving drinks or dinner, or is nearby. Another possible suggestion may be to alert the user when the bathroom is not in use such that the user can go and use it. Another possible alert may be to inform the user when the seat belt sign is turned on or off. Yet another possible alert may be to inform the user if someone else is taking out their bag from the storage bin. Another possible alert may be to inform the user that the airplane is about to land at the destination. Yet another possible alert may be to inform the user of an announcement that turbulence is about to occur. Accordingly, based on determining that the environment sampled is an airplane, the control circuitry 220 and/or 228 may provide several suggestions to the user.

At 450, the user may select one or more suggestions as triggers and responses to triggers. The command selected by the user, i.e., command to detect a triggering event and, if such an event is detected, to provide the predetermined response, may be processed with NLP at 455.

At 460, the control circuitry 220 and/or 228 may continue to monitor the real-world environment and transcribe the data obtained from the monitoring into text.

The control circuitry 220 and/or 228 at 465 may perform semantic matching of the transcribed environment to determine if a triggering event has occurred.

If a determination is made that the triggering event has occurred, then the control circuitry 220 and/or 228 may interact with the real-world environment based on the processed command and semantic matching, as depicted at 470.

Semantic matching for an audio- or speech-related trigger may involve the control circuitry 220 and/or 228 using a microphone (on or off the device) to continuously listen to speech for an audible sound in the real-world environment that is within a predetermined vicinity of the immersive device. For verbal triggers, automatic speech recognition (ASR) may be used to identify spoken words or phrases. If the speech is in a foreign language, automatic translation may be performed to convert the foreign language speech to a usable form, and the control circuitry 220 and/or 228 may then match the semantic meaning of detected sentences with the user's verbal trigger. For non-verbal audio cues (e.g., the sound of a subway arriving), the control circuitry 220 and/or 228 may record the ambient sounds for preset lengths (e.g., every one minute or every 10 seconds, both tunable). In order to save the battery power of the immersive device, these audio clips may be sent to a server where the large pretrained audio model (such as an audio LLM) may be used to analyze the sounds. The model, which may be any one or a combination of several models (e.g., LLM, neural network, support vector machine (SVM) model, random forest, visual or audio model, etc.), may be capable of describing the audio in natural language, identifying patterns or signatures indicative of specific events or triggers, such as the arrival of a subway.

Although FIG. 4 is described in terms of the control circuitry 220 and/or 228 monitoring the environment at the outset, providing the trigger and response suggestions based on the monitoring, and then alerting the user when the suggested trigger (which is selected by the user) is satisfied, the embodiments are not so limited. Other embodiments are also contemplated in which the user via the user device initiates the process by first providing a trigger and a response to the trigger and then monitoring for the occurrence of the trigger. Additional details relating to the user-initiated processes where the user device first provides instructions for the trigger and the response to the trigger are described further in FIG. 1.

With respect to visual monitoring of the real-world environment and then use of the monitored data to perform semantic matching, the process (not shown) may include the control circuitry 220 and/or 228 using cameras to capture images at set intervals (e.g., every second). The cameras used may be cameras in the immersive device or they may be cameras outside the immersive device from which the immersive device can obtain the data. The images obtained by the camera may be sent to a server for analysis (not shown). On the server, a large pre-trained model may be used. This model may be an LLM, neural network, support vector machine (SVM) model, random forest, visual or audio model, or some other type of model. It may also be a model that is a combination of various models. If an LLM model is used, such as GPT4V™, it will be used to process the images obtained by the camera. This model may be designed to semantically describe the visual data in each image, effectively turning visual cues into descriptive text that can be analyzed for triggers. To save the battery on the immersive device, it may be feasible to have the cameras in a standby mode and to activate capturing by a subset of cameras only based on the detection through low-power sensory inputs, e.g., infrared or LiDAR (not shown). Those sensory inputs may provide directional and spatial information to determine which cameras to activate to start capturing visual data for analysis.

The process of monitoring the real-world environment, transcribing it into text, and leveraging models to detect the occurrence of the trigger event may continue (e.g., loop around) until a triggering event is detected, as depicted at 475.

Once the detection is made that the triggering event has been detected, based on the confidence level of the semantic matching, at 480, in one embodiment, an alert may be transmitted to the user 410. In another embodiment, the response 480 may be any response that was predetermined by the user or suggested to the user at 445.

Figure 5:
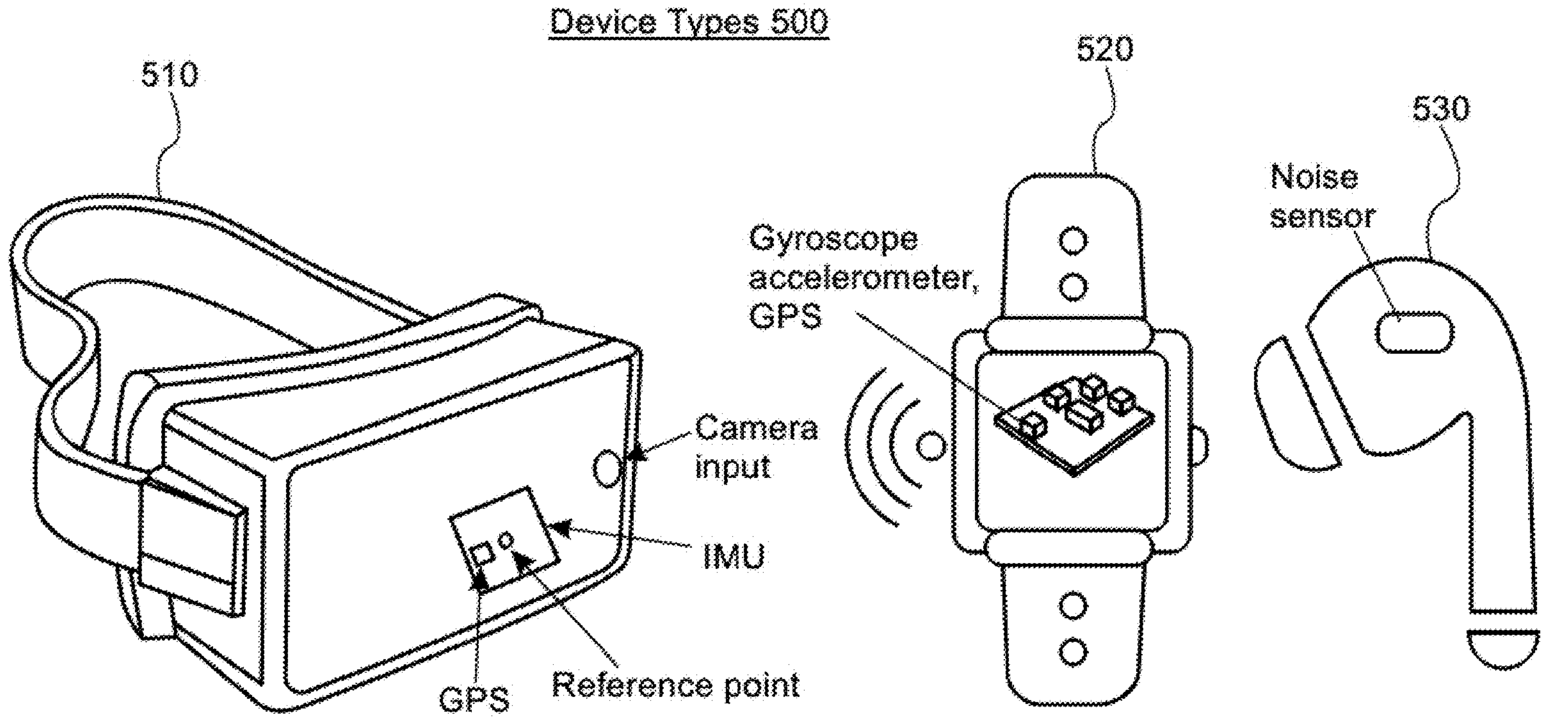
FIG. 5 is a block diagram of some examples of user devices, in accordance with some embodiments of the disclosure.

FIG. 5 is a block diagram of some examples of user devices, in accordance with some embodiments of the disclosure. The user device 500 may be any device that is capable of providing an immersive environment for the user. An immersive environment, as described earlier, is an environment in which, when immersed, the user may not be able to view, hear, or focus on the real-world environment or events occurring in the real-world environment outside the immersive environment. For example, if the user device 500 is a virtual reality headset that wraps around the user's head to fully enclose the user's eyes, then a user immersed in a virtual reality game using the headset may not be able to see their surroundings.

Some examples of devices capable of providing an immersive environment may include an XR device, smartwatch, smart earbuds, smart headphones, smartphone, laptop, tablet, smart glasses, gaming device, or any other device that focuses the user's attention on the media asset, content item, audio file, or any other type of content that is displayed or audibly provided to the user via the user device.

The user device 500 may also include various sensors for monitoring the real-world environment around the user device. For example, a VR headset 510 may include a camera that is outward facing to capture the real-world environment outside the VR headset. It may also include an IMU and GPS for determining orientation and location of the VR headset. In another example, a smartwatch 520 may include a gyroscope, accelerometer, GPS and many other types of sensors for monitoring the real-world environment outside the smartwatch. In yet another embodiment, smart earbuds 530 may include a noise sensor (or a microphone) that may be able to pick up sounds in the real world that are in the vicinity of the smart earbuds. All such devices 500 may be able to create an immersive environment and when the user is immersed in the immersive environment, the user may likely not be able to focus on the environment outside the user device, or their level of focus may be low, such as to other visuals, audio, and movements surrounding the user. The embodiments described herein may allow the user to be immersed in the immersive environment created by user device 500 and at the same time allow the user to interact with the real-world environment, thereby allowing the user to keep enjoying the immersive experience but not missing out on desired events outside the immersive environment.

FIGS. 6A-6D are exemplary use cases of immersive environments created via a user device, in accordance with some embodiments of the disclosure. One example of a use case of providing awareness outside the immersive environment by detecting event triggers and activating predetermined responses when the event triggers are satisfied is in an airplane setting as depicted in FIG. 6A. In this use case, a user 610 may be a passenger on an airplane. The user may be immersed in the user device 615, which may be a smart headset/headphone. The user may input via the user device 615 (or a device connected to the user device, such as a smartphone) a trigger and a response to a trigger. For example, the user may input an IFTTT-type trigger condition and upon occurrence of that condition or event, a desired response. For example, the user 610 may input "If a flight attendant comes by offering drinks" as a trigger, then "alert me indicating drinks are here." Any other form or style of trigger and response may also be inputted by the user, e.g., "If a flight attendant asks what I would like to drink" as a trigger, then "ring a particular ringtone in my ear" or "audibly indicate to the flight attendant, 'Please give me some orange juice,'" or "ask if she has orange juice," and if the response is no, then "do not alert me." The trigger/response in the form of an IFTTT rule may be a single or multiple tiered rules.

Once the trigger and response are inputted, either by the user or by the system automatically, such as based on a suggestion to the user, then the user device 615 may start monitoring to audibly listen for a flight attendant asking for drink orders. The language used by the flight attendant may vary. For example, the flight attendant may say "Would you like something to drink," or "Drink, ma'am?," "Would you like something with your crackers?" or any other form indicating that the flight attendant is serving drinks. To analyze and determine whether the flight attendant is serving drinks or performing another flight attendant duty, sensors associated with the user device may listen in on flight attendant speech. Such speech may be transcribed using ASR technology and used as input into a model, such as an LLM model. The LLM model may analyze the sensory input to detect whether the trigger condition has actually been satisfied. In other embodiments, the LLM model may detect whether the flight attendant is actually serving drinks or performing some other function, i.e., it detects if the trigger condition of "If a flight attendant comes by offering drinks," has been satisfied.

The output from the LLM, based on the sensor input of the speech monitored in the vicinity of the user device, is a textual output. The LLM may apply various data analysis techniques, such as deep learning, data classification, data clustering, text analysis (using natural language processing), regression analysis, sentiment analysis, etc., to analyze the sensor input and detect whether the trigger condition (e.g., flight attendant serving drinks) has been satisfied. If satisfied, then the control circuitry of the user device may be instructed to provide the user 610 the desired response, e.g., alert the user that drinks are being served etc.

Referring back to FIG. 6A, which depicts the user 610 wearing the immersive device 615, which is a headphone. In another embodiment, instead of the headphones, the user 610 may be using another user device, such as a XR headset that is all-encompassing and covers all of the user's eyes, or another device, such as a laptop, smartwatch, smartphone, tablet, etc., that may provide an immersive environment. When the user is immersed in the immersive environment, the user 610 may miss the flight attendant offering refreshments. In some embodiments disclosed herein, the user may be able to customize the system by saying "Please notify me if the flight attendant is offering refreshments." The user may also set up the command "Display 'Orange Juice, please' on my headset's outward-facing display when the flight attendant is offering refreshments." If such a command is executed, the flight attendant may be able to see, based on the displayed message, that the user wishes to have orange juice and may place the orange juice on the user's tray table without disturbing the user from enjoying his immersive experience. The user may also command the device "If the attendant is nearby, look at what drinks are available and provide a list on my screen for me to select from." The user may also ask the device to monitor other surroundings, such as the restroom, and alert him when it is no longer occupied.

In some embodiments, all user devices on the flight could be operating in a collaborative mode to better monitor the real-world environment within the flight so that the user can define their trigger conditions and responses for situations where their own devices cannot monitor. For example, one user device that is closer to the restroom may be in a better position to gain a visual of the restroom sign and monitor its availability and transmit the data to another user device that is farther from the restroom and whose camera is not able to see the restroom in its field of view. The trigger and response may be input by voice, typing, or even adaptively provided by the system, for example, the system finds out it is a flight environment, and can provide these possible frequently used monitoring selections that may be adapted to user preference and past experiences.

Figure 6B:
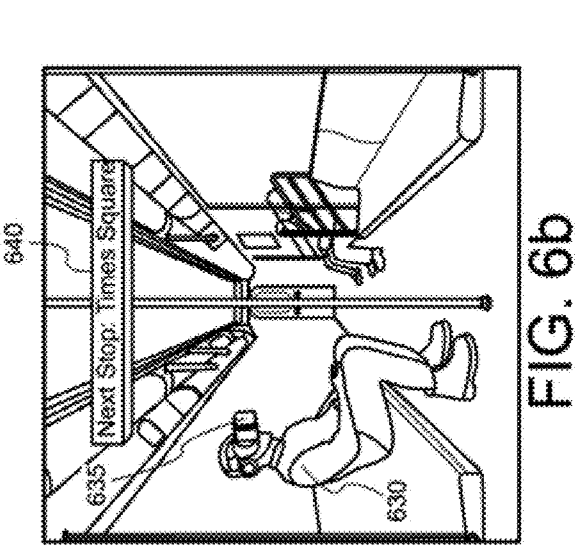

Another use case of the embodiments is disclosed in FIG. 6B. In this use case, user 630 may be traveling in a subway in New York City. While traveling in the subway, the user 630 may be immersed in a user device 635, which may be a virtual reality headset. The user may indicate a trigger condition to alert the user when the user's destination, Times Square, is reached. The user may indicate further instructions, such as "Alert me a few minutes before the train reaches Times Square." Based on the trigger condition, the microphone and camera of the virtual reality headset 635 may start monitoring the environment outside the virtual reality headset. For example, the camera may detect a display 640 in the train that indicates the next stop, e.g., "Next Stop: Times Square" indicated on display 640. The virtual reality headset 635 may use that visual sensory data as input to a model. The virtual reality headset 635 may also listen to audible sounds, such as an announcement by the train conductor indicating that Times Square is the next stop. Such audible sensory input may also be used as input into a model, such as an LLM. A GPS sensor associated with the user device 635 may also be utilized. For example, the GPS sensor may detect the user device's current location and based on the determination provide an alert to the user if the GPS location indicates that Times Square station is close by or within a predetermined distance. Such GPS data may also be used as input into a model. Having received this input, the LLM, or any other model used, may then analyze the input and produce a textual output describing the sensory input received. The textual output may then be semantically matched with the trigger condition to determine with a certain confidence level whether the trigger condition has been satisfied. If the trigger condition has been satisfied, depending on the confidence level of the trigger condition being satisfied, a response may be provided to the user 630.

The user 630 may also be able to customize the system as desired. Besides being able to customize it for location-type alerts, e.g., "Notify me when the train is near Times Square," the user may also ask for the response to provide more detailed information, which may require the system to collaborate with other systems, such as a train authority system. For example, the user may say, "When the subway nears Times Square, please overlay a detailed map within the XR environment, highlighting the best exit route from the train platform." In addition, the user may say, "Whenever there is a new station announcement, show the station name on my screen." The user may also input a trigger to alert the user if all the seats are taken and there is an old person/pregnant woman standing in front of the user who needs a seat. The user may also input a trigger condition to watch for suspicious persons approaching the user. All such trigger conditions may require deeper understanding and use of artificial intelligence, which may be obtained by leveraging an LLM.

Figure 6C:
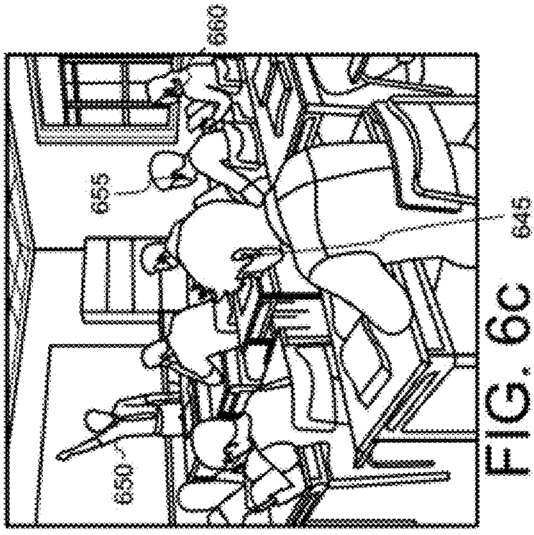

Another use case of the embodiments is disclosed in FIG. 6C. In this use case, user 645 may be wearing smart earbuds and listening to a podcast while in a classroom. In addition to user 645, users 655 and 660 may also be wearing smart earbuds and listening to content while being in the same classroom. In this use case, the user may input at trigger condition to alert the user 645 if a certain topic or keyword is mentioned by the teacher 650, for example, if the teacher calls on user 645 or discusses a topic that is of interest to the user 645. Having received the trigger condition, a microphone of the smart earbuds may listen for audible sounds within the vicinity of the user 645. The smart earbuds may also connect in a peer-to-peer connection with other smart earbuds in the classroom worn by users 655 and 660 to obtain audible sounds. The peer-to-peer connection may allow a farther listening reach to monitor audible sounds that may not be loud or clear enough for the earbuds worn by the user 645 to hear based on its proximity to the teacher 650 being farther than that of other users 655 and 660, who are closer to the teacher 650. As such, any of the user devices discussed in FIGS. 6A-6D, or in other embodiments, may also establish a peer-to-peer connection with other user devices to obtain sensory input. Once the sensory input is received, it may be used as an input into a model to produce a textual output which may then be semantically matched with the trigger condition to determine whether a trigger condition has been satisfied.

Figure 6D:
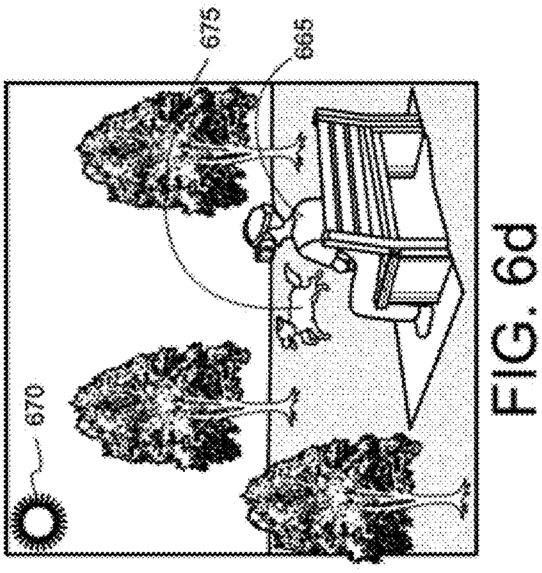

Another use case of the embodiments is disclosed in FIG. 6D. In this use case, a user 665 may be sitting on a park bench while the sun 670 is out and having his dog 675 sit with him, or play around, nearby where he is sitting. The user 665 may input any one of a plurality of trigger conditions. For example, user 665 may input at trigger condition to notify the user if their dog 675 runs farther away from the user. They user 665 may also input a trigger condition to notify the user once the sun 670 has set or once it has started to become dark. Based on the trigger condition inputted, sensors associated with a user device in which the user is currently immersed may be used to monitor the setting of the sun 670 or the running away of the dog 675. For example, both visual and audible sensors associated with the user device may be used. The visual sensors may monitor the setting of the sun or the running away of the dog while the audible sensors may monitor barking sounds of the dog, which may differ when the dog is near versus when the dog is far away. All such sensor data may be inputted into a model, such as an LLM, to contextually describe the monitored sensor input such that it can be used to semantically match with the trigger condition and detect whether the trigger condition has been satisfied. In some embodiments, pre-processing and/or post processing of the sensor data may be performed either before using the sensor data as input into an LLM or after obtaining an output from the LLM and prior to performing semantic matching. Such pre-processing and post-processing of sensors data, such as NLP, may, in some embodiments, format or prepare the data to be processed by the LLM or the semantic engine. For example, pre-processing of sensor data that would convert the sensor data into prompts for the LLM may be performed. Likewise, NLP processing of the LLM output may format the data, or normalize the data, such that it can be processed by the semantic engine for determining a semantic match.

Although the use cases have been described in terms of the user providing the trigger condition and the response to the trigger condition, the embodiments are not so limited. For example, the system may perform visual, audio, location, and other types of monitoring of the environment around the user device automatically and without user direction. Based on the monitoring, the system may automatically provide a few suggestions to the user of the type of trigger conditions and the responses that the user may select such that they can continue to enjoy the immersive experience while still being aware of to the environment around them.

In some embodiments, as suggested via FIG. 6C, a plurality of devices may set up a peer-to-peer connection for enhancing the monitoring of the real-world environment. For example, multiple user devices may be integrated to form an environmental monitoring network group. The collaborative approach may enhance the environment monitoring by leveraging the combined capabilities of the individual user devices. To form such a network and utilize combined capabilities, techniques for device network formation, distributed sensing of the real-world environment, and collaborative data processing may be used.

With respect to forming the device network, a discovery protocol or a dynamic network configuration approach may be used. The discovery protocol embodiment may involve user devices within proximity using Bluetooth, Wi-Fi Direct, or similar protocols to discover each other and establish a network. This may involve a handshake protocol where devices share capabilities (audio sensing, visual sensing, processing power, etc.) and availability for participation in a collaborative monitoring effort. The dynamic network configuration approach may include the system dynamically configuring the network topology based on the devices' capabilities. The localization of each device may be obtained by analyzing the audio/visual cues sensed by the devices. In this embodiment, user devices with higher processing capabilities may take on more complex analysis tasks, while sensor-rich devices may focus on data collection.

With respect to distributed sensing of the real world environment, in some embodiments, approaches that include sensor data sharing and synchronized sampling may be used. The approach involving sensor data sharing may include each user device in the network sharing its sensory data (audio clips, images, sensor readings) with designated processing units within the network, such as a server or another user device. The approach involving synchronized sampling may include the user devices synchronizing their data sampling efforts to ensure comprehensive coverage of the real-world environment surrounding the user device that is used by the user during the immersive session. For instance, visual sensors from multiple user devices looking at different places could be synchronized to capture images at the same time, and those devices looking at the same view may be synchronized to take images alternately in order to avoid unnecessary sensing.

In some embodiments a collaborative data processing approach may be used to leverage all the user devices in the network to properly manage the data processing load. For example, a central device, like a server, may be designated to aggregate the collected data, aligning data timestamps, sensor location, and other related input. A model, such as an LLM, may then be used to transcribe the aggregated data. The LLM may transcribe the audio data, visual data, and all the other metadata, like the time stamps, the locations, and user device specifications, etc., into text such that the data can be used for performing semantic matching. In some embodiments, after processing data using the LLM, additional processing, such as NLP, may be performed on the data prior to performing the semantic matching.

Figure 7:
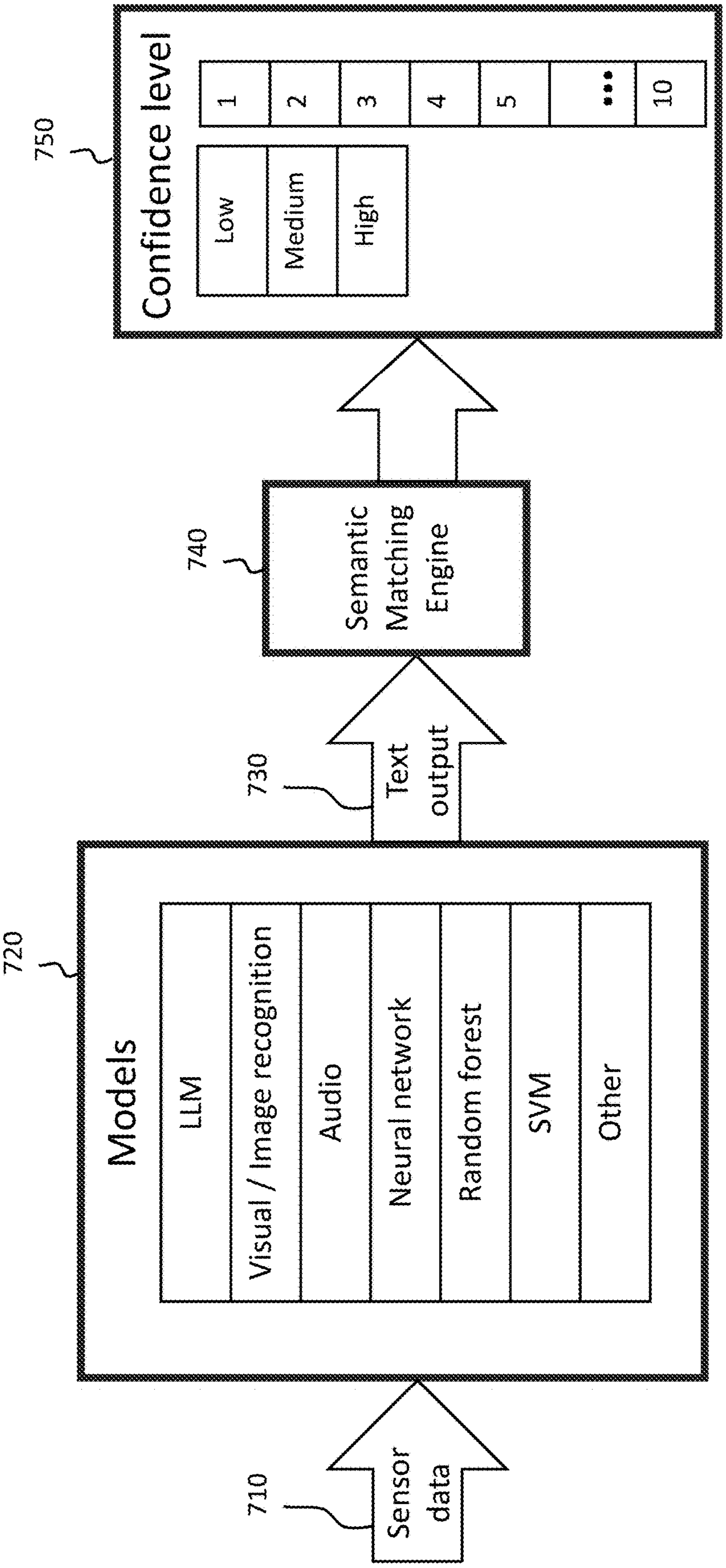
FIG. 7 is a block diagram of inputting sensor data into a model to generate a text output, semantically matching the text output with a user trigger input, and determining a confidence level of the semantic match, in accordance with some embodiments of the disclosure.

FIG. 7 is a block diagram of inputting sensor data into a model to generate a text output, semantically matching the text output with a user trigger input, and determining a confidence level of the semantic match, in accordance with some embodiments of the disclosure.

In some embodiments, data 710 from a plurality of sensors may be used as an input into a model. These sensors may include sensors that can detect images, sounds, location, temperature, heart rate, or any other type of condition that can be deducted by current existing sensor technology. In one embodiment, although a plurality of sensors that are monitoring the real world environment around the user device may be used to provide input into the model, the model may only select data from certain sensors that produce data relevant to the trigger condition. For example, if the trigger condition requires monitoring of audible sounds or speech input, then data from audio sensors (or sensors that can provide audio data) may be used and data from other sensors, such as GPS data, may not be used by the LLM model. In another embodiment, which sensors are to be used for monitoring may be determined based on the type of trigger condition that is to be satisfied (e.g., visual, audio, or location sensors).

As depicted at 720, the models may be any one or a combination of an LLM, visual/image recognition, audio, neural network, random forest, SVM or any other type of model that is capable of transcribing the sensory input into a text form which then can be used to detect whether a trigger condition has been met. In other words, the model can take the sensory input, make sense of it, and then describe it in a textual format. As described earlier, to do so, the model may apply various data analysis techniques, such as deep learning, data classification, data clustering, text analysis (using natural language processing), regression analysis, sentiment analysis, etc., to analyze the received sensor input data.

At 730, the model may produce a textual output based on the sensory data 710 received and the textual output may be used by a semantic matching engine at 740 to match it with an inputted trigger condition and determine with a confidence level 750 whether such a trigger condition has been met. Based on the confidence level that the trigger condition has been met, a response or an action (not shown) may be taken by the system. The type of responses may vary based on the level of confidence. For example, for a low confidence level, a different response may be provided than for a high confidence level. The confidence level 750 scale may range from low to high or from 1-10 or any other desired denomination. In some embodiments, the user may be provided an option to preset the confidence level for a match as "high," "medium," or "low." Such user setting may be used to determine the threshold for triggering an alert or response, allowing users to balance sensitivity and specificity to their preferences.

Figure 8:
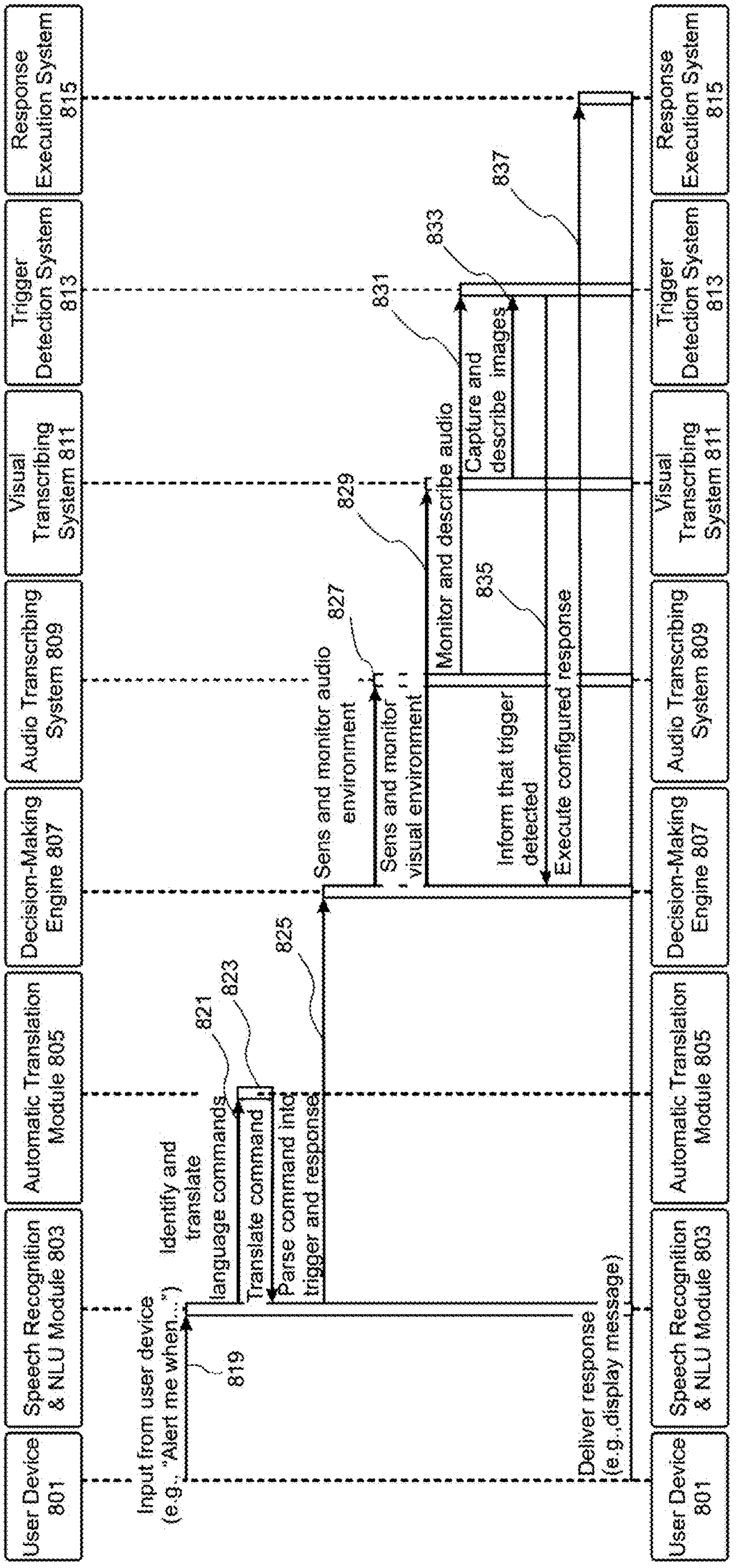
FIG. 8 is a flow diagram for using NLP to interpret and process user commands, monitoring for triggers, and executing the specified response, in accordance with some embodiments of the disclosure.

FIG. 8 is a flowchart of a process 800 for using NLP to interpret and process user commands, monitoring for triggers, and executing the specified response, in accordance with some embodiments of the disclosure. The process 800 may be implemented, in whole or in part, by systems or devices such as those shown in FIGS. 2-3. One or more actions of the process 800 may be incorporated into or combined with one or more actions of any other process or embodiments described herein. The process 800 may be saved to a memory or storage (e.g., any one of those depicted in FIGS. 2-3) as one or more instructions or routines that may be executed by a corresponding device or system to implement the process 800.

In some embodiments, process 800 may include components such as a user device 801, speech recognition and NLU module 803, automatic translation module 805, decision-making engine 807, audio transcribing system 809, visual transcribing system 811, trigger detection system 813, and response execution system 815. These components may communicate with each other to provide the awareness to the user outside their immersive environment by obtaining the user- or system-inputted triggers and responses and activating a response if a trigger is satisfied.

The process, in one embodiment, may include receiving from the user device 809, at 819, user-initiated interactions with the system using voice commands in their natural language. For example, a command could be as specific as "Show on the display that I need an orange juice when the flight attendant is near."

The control circuitry 220 and/or 228 associated with the system, such as the system depicted in FIG. 2, may employ speech recognition technology, such as by using the speech recognition and NLU module 803, to convert spoken words into text. For languages other than the system's default, automatic language translation module 805 may translate the command, as depicted at 823, such that the translation can be used to ensure the command is accurately understood across languages.

The natural language understanding (NLU) component 803, at 825, may analyze the transcribed text to delineate the user's command into two main parts: the trigger (the condition or event that must be detected) and the desired response (the action the system should take when condition is met).

For instance, in the command "Alert me when the flight attendant is near," "the flight attendant is near" is identified as the trigger, and "Alert me" as the default response action. The NLU component, integral to parsing user commands into "trigger" and "response" parts, can be efficiently implemented using a large language model (LLM). This is achieved by structuring a pre-defined prompt template that guides the LLM to dissect the command into its constituent elements. The template could be phrased as follows: "Given the command: [customer command], identify and categorize it into two distinct parts: the 'trigger,' which specifies the condition or event to be detected, and the 'response,' detailing the action the system is to execute upon trigger detection. Format the output in JSON, with two key fields: 'trigger' and 'response.' If either component is indiscernible, mark as 'N/A.'" This structured approach ensures that the LLM processes the command with a clear understanding of the task requirements, facilitating accurate and efficient extraction of the trigger and response elements from natural language inputs.

The trigger part may be analyzed (not shown), such as by the decision-making engine 807, to ensure that the trigger was clearly captured and can be understood, and the device has capability to perform the response to the trigger. If the trigger is unclear, the control circuitry 220 and/or 228, may use the process described in FIG. 10 to revise the trigger based on back-and-forth communication with the user. The trigger may also be analyzed to determine whether the control circuitry 220 and/or 228 needs to monitor audio and/or visual cues for the trigger. This may be implemented, in one embodiment, using an LLM or other models with a pre-defined prompt template that includes instruction such as:

Analyze the provided trigger "[custom trigger]" to determine the necessary sensory monitoring required.

Assess whether this trigger pertains to auditory cues, visual cues, location-based cues, or a combination thereof for effective detection.

Structure your analysis to output "audio," "visual," or "both."

Based on the LLM's analysis, the control circuitry 220 and/or 228, may dynamically assign the environmental monitoring task to the appropriate sensor(s) available within the user device. For instance, devices such as AirPods, equipped solely with audio sensors, will be assigned audio-based monitoring tasks, whereas an XR headset, which houses both audio and visual sensors, can handle triggers requiring either or both types of sensory input. It may also leverage monitoring from other devices that are part of a network, such as a peer-to-peer network with the user device used by the user that is immersed in the immersive environment. Upon assignment, sensing and monitoring of the audio and/or visual environment may be performed, as depicted at 827 and 829.

The data obtained through monitoring may then be transcribed using either the audio transcribing module 809 or the visual transcribing module 811, depending on the type of data, e.g., audio or visual data. If the sensor data obtained through monitoring the real-world environment is audio data, then for verbal sensor data, ASR may be used to identify spoken words or phrases. If the speech is in a foreign language, automatic translation converts it to a usable form, and the system then matches the semantic meaning of detected sentences with the user's verbal trigger. For non-verbal audio cues (e.g., the sound of a subway arriving), the control circuitry 220 and/or 228 records ambient sounds for preset lengths (e.g., every 10 seconds, 15 seconds, 1 minute, etc.) and sends them to a server, where a model, such as an LLM, may be leveraged to analyze the sounds. If the sensor data is visual data, then LLMs like GPT4V may be used to process the images.

The sensor data is transcribed into descriptive text that can be analyzed to determine whether the trigger condition is satisfied. For example, the visual transcribing module 811, at 833, transcribes the images obtained through monitoring to descriptive text and transmits the text to the trigger detection system 813. Likewise, the audio transcribing module 809, at 831, transcribes the speech and audio sounds obtained through monitoring to descriptive text and transmits the text to the trigger detection system 813.

If a determination is made by the trigger detection system 813, based on the received transcribed text, that the trigger condition is satisfied, it may, at 835, inform the decision-making engine 809, which in turn may cause to be executed the response at 837 using the response execution system 815. While the default response might be set as a simple notification, users may have the option to specify custom responses, such as displaying a message or executing a specific action. The NLU module 803 may parse the user's command to extract and determine the specified response action.

Once the trigger detection system 813 detects a trigger, at 831 or 833, it may activate the predefined response by the response execution system. This may involve converting the abstract response command into a concrete action, such as triggering a visual alert on the device's display, generating an audible alert, or any other specified user action. The system's decision-making engine 807 may manage this process, ensuring that the response appropriately matches the user's desired response that was received at 819.

Figure 9:
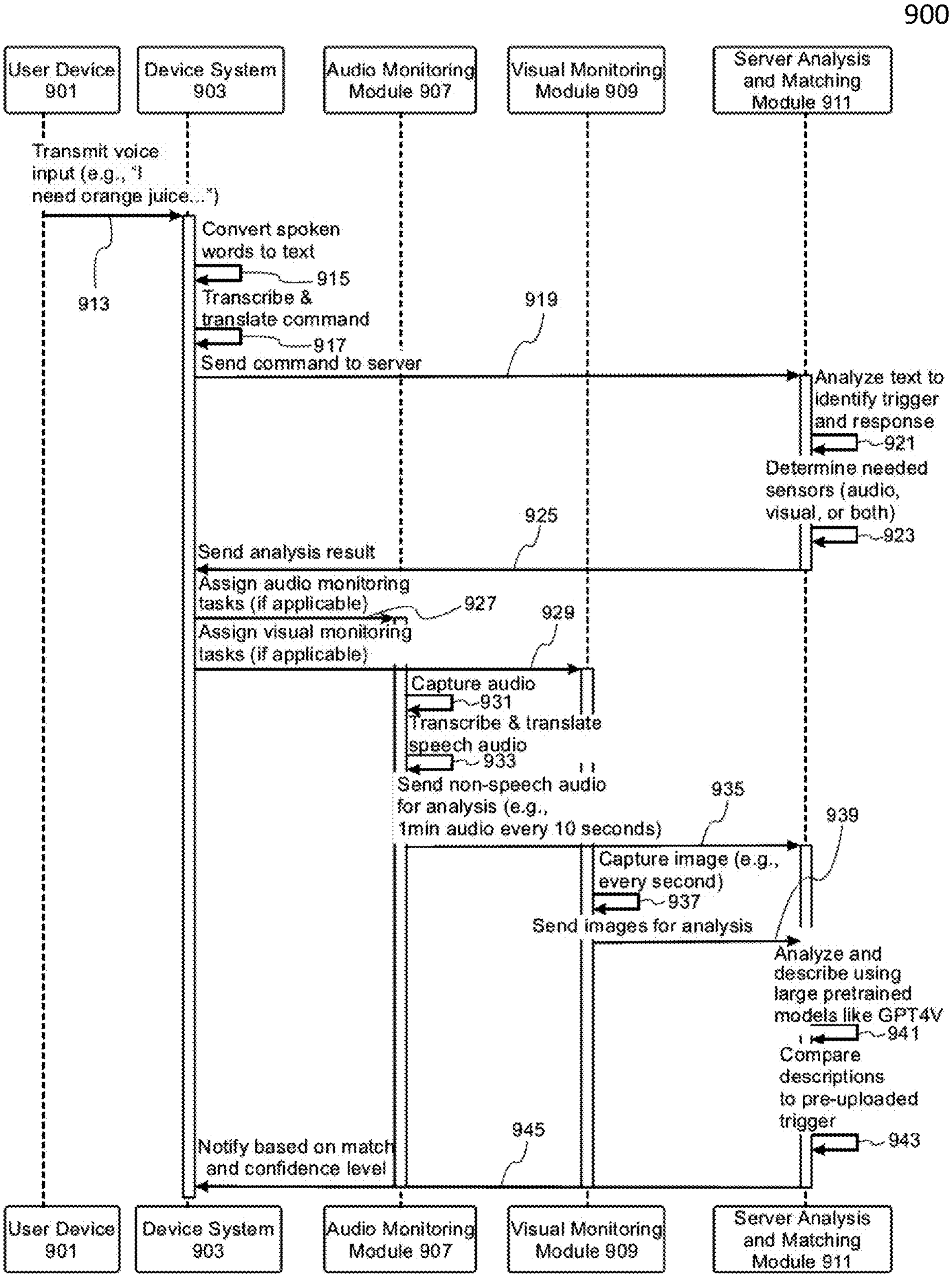
FIG. 9 is a flow diagram for detecting environmental triggers using audio and/or visual data, in accordance with some embodiments of the disclosure.

FIG. 9 is a flow chart of a process 900 for detecting environmental triggers using audio and/or visual data, in accordance with some embodiments of the disclosure. The process 900 may be implemented, in whole or in part, by systems or devices such as those shown in FIGS. 2-3. One or more actions of the process 900 may be incorporated into or combined with one or more actions of any other process or embodiments described herein. The process 900 may be saved to a memory or storage (e.g., any one of those depicted in FIGS. 2-3) as one or more instructions or routines that may be executed by a corresponding device or system to implement the process 900.

In some embodiments, at 913, user device 901 may transmit a voice input such as "I need orange juice" to the device system 903. The device system may convert the spoken words to text at 915 and transcribe and translate the command at 917. The device system may then send the command to a server 911 for analyzing the text to identify the trigger and response at 921. The server may then determine, at 923, which type of sensors are needed for monitoring the real world environment to determine whether the trigger condition has been matched. The analysis performed by the server may be based on leveraging a model, such as an LLM model. The server may then, at 925, send its analysis results to the device system 903.

Once the device system 903 receives the server's analysis results, the device system may assign either audio 927 or visual 929 monitoring tasks to respective modules, e.g., audio monitoring to an audio monitoring module 907 and visual monitoring to a visual monitoring module 909.

The audio monitoring module 907 and visual monitoring module 909, utilizing audio and visual sensors, may capture audio and image data of the real-world environment outside the user device. Such data may be captured to determine whether the trigger condition has been satisfied. For example, if the trigger condition is "Alert me when the flight attendant is serving drinks," the sensor data may audibly and/or visibly be captured and then analyzed and matched with instructions for occurrence of the trigger received, to determine whether in fact a flight attendant is within the vicinity of the user and serving drinks.

The audio monitoring module 907 and visual monitoring module 909 at 931, 933, 937, and 939, such as of the surrounding within a distance of the user device or another remote device, may transmit the obtained data for analysis to the server analysis and matching server 911 or server module.

The server, at 941 and 943, may leverage a model, such as an LLM, or other models depicted at block 720 of FIG. 7, to detect whether the trigger condition has been satisfied. In other words, the server leveraging the LLM may compare the sensor data to the trigger condition to determine if the sensor data indicates that the trigger condition has been satisfied. To do so, in some embodiments, the sensory data may be described into text and then compared with the textual description of the trigger condition provided by the user device.

If a determination is made by the server analysis and matching module 911 that the trigger condition has been met, then the server analysis and matching module 911 may notify the device system at 945 that a semantic match between has been made. The server analysis and matching module 911 may also notify the device system at 945 the level of confidence at which it has determined that the semantic match has been made, i.e., that the trigger condition has been satisfied.

Figure 10:
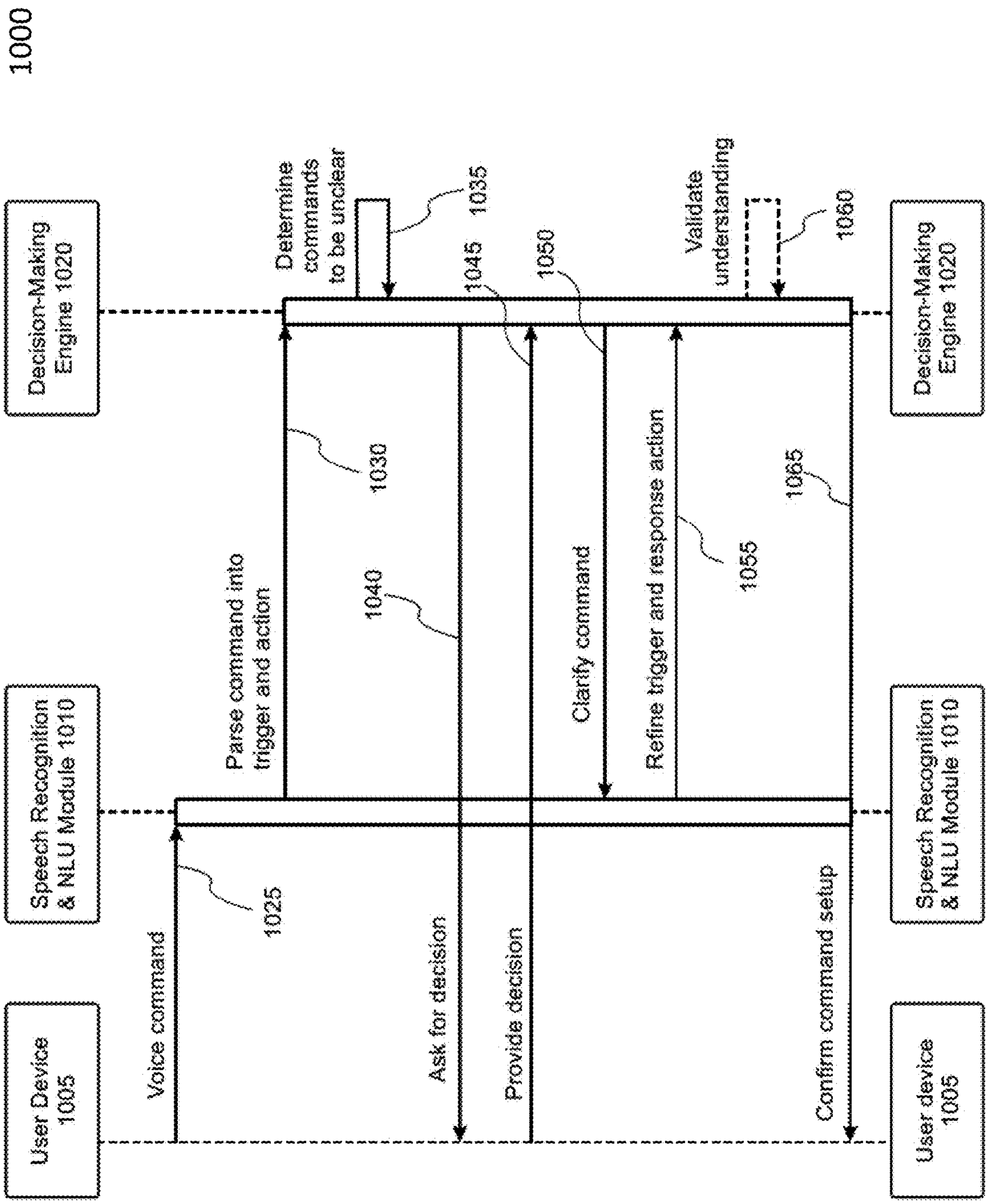
FIG. 10 is a flow diagram for clarifying user input relating to trigger and response to trigger, in accordance with some embodiments of the disclosure.

FIG. 10 is a flow chart of a process 1000 for clarifying user input relating to a trigger and response to the trigger, in accordance with some embodiments of the disclosure. The process 1000 may be implemented, in whole or in part, by systems or devices such as those shown in FIGS. 2-3. One or more actions of the process 1000 may be incorporated into or combined with one or more actions of any other process or embodiments described herein. The process 1000 may be saved to a memory or storage (e.g., any one of those depicted in FIGS. 2-3) as one or more instructions or routines that may be executed by a corresponding device or system to implement the process 1000.

Process 1000 may include communications between a user device 1005, speech recognition and NLU module 1010, and decision-making engine 1020. The process may be used, in some embodiments, for the control circuitry 220 and/or 228 to ensure that the user's intent in inputting the command, i.e., the trigger and the response to the trigger, is accurately captured, understood, and implemented. Since it may not be accurately captured or understood, the process is used to leverage AI models to suggest possible actions to trigger after a clarification with the user.

In some embodiments, at 1025, a voice command may be received from the user device 1005 by a speech recognition and NLU module 1010. After receiving the command, which is a trigger and a desired response to the trigger, the speech recognition and NLU module 1010 may parse the command into a trigger and an action and transmit the parsed command to the decision-making engine 1020.

At 1035, the decision-making engine 1020 may determine that the command is unclear. There may be many reasons for the command to be unclear. For example, the user speech may not be accurately captured due to the user speaking too quickly, not pronouncing words properly, or having slurred speech. The user's command may also be determined to be unclear because of what the user is asking the device to perform or accomplish. For example, the user device may not have such capabilities or may not be able to provide the specified response because the specified response may be too complex or the device may be too slow to perform the action.

If the command is determined to be unclear for any reason, then the decision-making engine 1020 may ask the user for a decision at 1040. The decision-making engine 1020 may also ask the user to clarify the command. The decision-making engine 1020 may also leverage a model, such as an LLM model or another AI model (not shown), and suggest possible clarifications, alternatives, or other actions to a trigger and, at 1040, ask the user for a decision to approve or reject the suggestions. For example, a suggestion made to the user, if the command response is deemed to be too complex for the device to handle with its capabilities, may be to select a simpler response instead that is within the device's capabilities.

At 1045, the decision-making engine 1020 may receive a decision from user device 1005 based on the suggestions provided. In some embodiments, the decision-making engine 1020 may clarify the command at 1050 and transmit it to the speech recognition and NLU module 1010.

At 1055, the speech recognition and NLU module 1010 may refine the trigger and response based on the received clarified command and transmit it to the decision-making engine 1020. If the decision-making engine 1020 can validate, at 1060, the received trigger and response, e.g., a determination is made that the device can accomplish the response, or a determination is made that the command is clear, then the decision-making engine 1020, at 1065, may confirm the command setup. Once the command setup is confirmed, the system may provide the desired response to the user, based on the revised and clarified response, if the trigger condition is satisfied.

It will be apparent to those of ordinary skill in the art that methods involved in the above-mentioned embodiments may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. Only the claims that follow are meant to set bounds as to what the present invention includes.

Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

receiving an input, from a user device, describing an event trigger and a response to the event trigger, wherein the event trigger is associated with occurrence of an event in a real-world environment surrounding the user device;

obtaining, based on monitoring of the real-world environment outside the user device, input data from one or more sensors associated with the user device;

obtaining a second textual output for the input data obtained from the one or more sensors associated with the user device, wherein the second textual output describes the event that occurred in the real-world environment;

determining a semantic match between the obtained second textual output and a first textual output associated with the event trigger received from the user device to determine whether the event trigger has occurred; and in response to determining the semantic match, activating the response to the event trigger.

2. The method of claim 1, further comprising:

inputting the input data obtained from the one or more sensors that is associated with the monitoring of the real-world environment surrounding the user device into a large language model (LLM); and leveraging the LLM to generate the second textual output for the input data obtained from the one or more sensors associated with the user device.

3. The method of claim 2, wherein leveraging the LLM to generate a textual output of the data obtained from the one or more sensors further comprises analyzing, by the LLM, the input data obtained from the one or more sensors, wherein the analysis utilizes data used to train the LLM.

4. The method of claim 1, wherein determining the semantic match further comprises:

converting the event trigger received from the user device into the first textual output, wherein the event trigger is received from the user device in natural language and is converted to the first textual output by using automatic speech recognition (ASR);

normalizing the first textual output and the second textual output to a same format; and comparing the normalized first textual output and the second textual output to determine the semantic match.

5. The method of claim 1, wherein obtaining the input data from the one or more sensors associated with the user device comprises:

determining, based on the event trigger that only audio data is to be monitored; and in response to determining that only audio data is to be monitored, obtaining only audio data and not obtaining data from other sensors that is unrelated to audio data.

6. The method of claim 1, wherein obtaining the input data from the one or more sensors associated with the user device comprises:

obtaining audio data from an audio sensor and visual data from a visual sensor;

determining that the event trigger is associated with a visual event in the real-world environment surrounding the user device; and in response to determining that the event trigger is associated with the visual event in the real-world environment surrounding the user device, selecting only the visual data from the visual sensor as an input to obtain the second textual output.

7. The method of claim 1, further comprising:

determining a confidence level for the semantic match; and activating the response to the event trigger based on the determined confidence level.

8. The method of claim 1, wherein the occurrence of the event in the real-world environment surrounding the user device occurs when the user device is engaged in an immersive environment, wherein the user device used to engage in the immersive environment is an extended reality (XR) device.

9. The method of claim 1, further comprising using an LLM to a) obtain the second textual output for the input data obtained from the one or more sensors associated with the user device and b) use the second textual output to determine the semantic match with the event trigger received from the user device.

10. The method of claim 1, wherein activating the response to the event trigger comprises transmitting an alert to the user device, wherein the alert is either a visual or an audible alert.

11. The method of claim 1, wherein activating the response to the event trigger comprises switching the user device to a pass-through mode to allow a user associated with the user device to see or hear the real-world environment surrounding the user device.

12. The method of claim 1, wherein receiving the input, from the user device, describing the event trigger and the response to the event trigger, further comprises:

monitoring the real-world environment surrounding the user device;

automatically suggesting one or more event triggers and responses to the one or more event triggers, based on the monitored real-world environment surrounding the user device;

determining a selection of the suggested one or more event triggers; and receiving, from the user device, the selected one or more event triggers as the input.

13. A system comprising:

communications circuitry configured to access a user device; and control circuitry configured to:

receive an input, from the user device, describing an event trigger and a response to the event trigger, wherein the event trigger is associated with occurrence of an event in a real-world environment surrounding the user device;

obtain, based on monitoring of the real-world environment surrounding the user device, input data from one or more sensors associated with the user device;

obtain a second textual output for the input data obtained from the one or more sensors associated with the user device, wherein the second textual output describes the event that occurred in the real-world environment;

determine a semantic match between the obtained second textual output and a first textual output associated with the event trigger received from the user device to determine whether the event trigger has occurred; and in response to determining the semantic match, activating the response to the event trigger.

14. The system of claim 13, further comprising, the control circuitry configured to:

input the input data obtained from the one or more sensors that is associated with the monitoring of the real-world environment surrounding the user device into a large language model (LLM); and leverage the LLM to generate the second textual output for the input data obtained from the one or more sensors associated with the user device.

15. The system of claim 14, wherein leveraging the LLM to generate a textual output of the data obtained from the one or more sensors further comprises, the control circuitry configured to analyze, using the LLM, the input data obtained from the one or more sensors, wherein the analysis utilizes data used to train the LLM.

16. The system of claim 13, wherein determining the semantic match further comprises, the control circuitry configured to:

convert the event trigger received from the user device into the first textual output, wherein the event trigger is received from the user device in natural language and is converted to the first textual output by using automatic speech recognition (ASR);

normalize the first textual output and the second textual output to a same format; and compare the normalized first textual output and the second textual output to determine the semantic match.

17. The system of claim 13, wherein obtaining the input data from the one or more sensors associated with the user device comprises, the control circuitry configured to:

determine, based on the event trigger that only audio data is to be monitored; and in response to determining that only audio data is to be monitored, obtaining only audio data and not obtaining data from other sensors that is unrelated to audio data.

18. The system of claim 13, wherein obtaining the input data from the one or more sensors associated with the user device comprises, the control circuitry configured to:

obtain audio data from an audio sensor and visual data from a visual sensor;

determine that the event trigger is associated with a visual event in the real-world environment surrounding the user device; and in response to determining that the event trigger is associated with the visual event in the real-world environment surrounding the user device, select only the visual data from the visual sensor as an input to obtain the second textual output.

19. The system of claim 13, further comprising, the control circuitry configured to:

determine a confidence level for the semantic match; and activate the response to the event trigger based on the determined confidence level.

20. The system of claim 13, wherein the occurrence of the event in the real-world environment surrounding the user device occurs when the user device is engaged in an immersive environment, wherein the user device used to engage in the immersive environment is an extended reality (XR) device.

21. The system of claim 13, further comprising, the control circuitry configured to use an LLM to a) obtain the second textual output for the input data obtained from the one or more sensors associated with the user device and b) use the second textual output to determine the semantic match with the event trigger received from the user device.

22. The system of claim 13, wherein activating the response to the event trigger comprises the control circuitry configured to transmit an alert to the user device, wherein the alert is either a visual or an audible alert.

23. The system of claim 13, wherein activating the response to the event trigger comprises, the control circuitry configured to switch the user device to a pass-through mode to allow a user associated with the user device to see or hear the real-world environment surrounding the user device.

* * * * *